US012135384B2

(12) United States Patent
Golestanian et al.

(10) Patent No.: US 12,135,384 B2
(45) Date of Patent: Nov. 5, 2024

(54) LOCALIZATION FUSION POSITIONING SYSTEM

(71) Applicant: Design Reactor, Inc., Palo Alto, CA (US)

(72) Inventors: Mehdi Golestanian, San Jose, CA (US); Chuantao Zang, Salt Lake City, UT (US); Adam Benson, Santa Clara, CA (US)

(73) Assignee: Design Reactor, Inc., Palo Alto, CA (US)

( * ) Notice: Subject to any disclaimer, the term of this patent is extended or adjusted under 35 U.S.C. 154(b) by 255 days.

(21) Appl. No.: 17/740,156

(22) Filed: May 9, 2022

(65) Prior Publication Data

US 2023/0358846 A1 Nov. 9, 2023

(51) Int. Cl.
*G01S 5/02* (2010.01)
*H04W 4/029* (2018.01)
(Continued)

(52) U.S. Cl.
CPC ......... *G01S 5/02522* (2020.05); *H04W 4/029* (2018.02); *H04W 4/33* (2018.02); *H04W 64/006* (2013.01)

(58) Field of Classification Search
CPC ............. G01S 5/02522; G01S 5/02955; G01S 2205/02; G01S 5/02526; G01S 5/0264;
(Continued)

(56) References Cited

U.S. PATENT DOCUMENTS

| 8,639,640 B1 * | 1/2014 | Kadous ................. G06N 20/00 342/451 |
| 9,261,365 B2 | 2/2016 | Rothschild |

(Continued)

OTHER PUBLICATIONS

Golestanian et al., "VariLoc: Path Loss Exponent Estimation and Localization Using Multi-Range Beaconing," in IEEE Communications Letters, Apr. 2019, pp. 724-272, vol. 23, No. 4, doi: 10.1109/LCOMM.2019.2903042.

(Continued)

*Primary Examiner* — Kabir A Timory
(74) *Attorney, Agent, or Firm* — Pillsbury Winthrop Shaw Pittman, LLP

(57) ABSTRACT

Provided is a process including: acquiring signal strength information that includes a plurality of signal strength measurements detected by a mobile computing device and that are each associated with a respective wireless signal measurement time; generating a wireless signal-based localization by localizing the mobile computing device based on the plurality of signal strength measurements and known locations of beacon devices; acquiring a plurality of mobility sensor measurements that are each associated with a respective mobility sensor measurement time; generating a mobility-based localization by localizing the mobile computing device based on the plurality of mobility sensor measurements; fusing the wireless signal-based localization and the mobility-based localization based on correspondence between the respective wireless signal measurement time for the signal strength measurements and the respective mobility sensor measurement time for the mobility sensor measurement to generate a fused mobile computing device localization.

20 Claims, 16 Drawing Sheets

(51) Int. Cl.
*H04W 4/33* (2018.01)
*H04W 64/00* (2009.01)

(58) Field of Classification Search
CPC ....... G01S 5/0278; H04W 4/029; H04W 4/33;
H04W 64/006; H04W 4/80; H04W 64/00
See application file for complete search history.

(56) References Cited

U.S. PATENT DOCUMENTS

| | | | |
|---|---|---|---|
| 10,587,988 B1* | 3/2020 | Huberman | ............ H04W 4/029 |
| 2010/0134288 A1* | 6/2010 | Huang | ............... G08B 21/0275 |
| | | | 340/572.1 |
| 2018/0196120 A1 | 7/2018 | Hehn et al. | |
| 2018/0252528 A1 | 9/2018 | Zhuang et al. | |
| 2018/0321353 A1 | 11/2018 | Patel et al. | |
| 2019/0124470 A1 | 4/2019 | Jiang et al. | |
| 2019/0383896 A1 | 12/2019 | Han | |

OTHER PUBLICATIONS

International application No. PCT/US2023/021591, International Search Report and Written Opinion dated Sep. 6, 2023.

* cited by examiner

LOCALIZATION FUSION POSITIONING SYSTEM

CROSS-REFERENCE TO RELATED APPLICATIONS

This patent is related to U.S. Non-Provisional patent application Ser. No. 17/740,161, filed 9 May 2022, titled "MONITORED ENVIRONMENT FINGERPRINT MODELING SYSTEM," and U.S. Non-Provisional patent application Ser. No. 17/740,166, filed 9 May 2022, titled "HYBRID FINGERPRINT PATH-LOSS LOCALIZATION SYSTEM." The entire content of each aforementioned patent filing is hereby incorporated by reference.

BACKGROUND

1. Field

This disclosure relates generally to localization systems and, more particularly, to fingerprint modeling-based localization systems.

2. Background

Positioning systems sometimes use mobile computing devices (e.g., mobile phones, tablets, wearables, and the like) to provide for navigation (e.g., indoor or outdoor) and/or determine location of a user in an environment. Such positioning systems sometimes require location sensors (e.g., beacons and/or access points) distributed throughout the environment, such as a building. These positioning systems may also require mapping information that maps the unobstructed and obstructed areas within the environment, while also detailing accurate locations of the location sensors within that environment. To provide for navigation, the mobile computing devices carried by users detect wireless signals generated by the location sensors and determine a position of the mobile computing device based on the signal strengths and known locations of those location sensors. The positioning system then uses the user location detailed in the mapping information to determine a current mobile computing device location of any detected mobile computing device within the environment. If a user of one of those user devices subsequently identifies a destination location, the positioning system may utilize the mapping information that maps the unobstructed and obstructed areas within the environment to determine a navigation path through the environment that avoids obstructions while ending up at the destination location.

However, the mapping information utilized by such conventional indoor navigation systems requires significant effort to produce and is often not detailed enough to provide accurate and obstruction-free navigation. Furthermore, such mapping information is static, and indoor spaces like those in the building described above may include dynamic or semi-static features (e.g., "work cubes", partitions, furniture, etc.) that can be moved and/or otherwise change their locations or orientations within the indoor space, while features may also be added to or removed from the indoor space over time, requiring the mapping information to be periodically updated to account for such changes in the indoor space. Similarly, location sensors may become unavailable and/or may be moved to other locations. Further still, current algorithms that localize a mobile computing device based on signal strength and known locations of location sensors are not particularly accurate with respect to the actual position and path that the mobile computing device is traveling through the environment.

SUMMARY

The following is a non-exhaustive listing of some aspects of the present techniques. These and other aspects are described in the following disclosure.

Some aspects include a process, including: acquiring, using a computer system, signal strength information that is based on signal strength of wireless radio frequency signals detected by a wireless transceiver included in a mobile computing device and that includes a plurality of signal strength measurements that are each associated with a respective wireless signal measurement time; generating, using the computer system, a wireless signal-based localization by localizing, using a wireless signal-based localization algorithm, the mobile computing device based on the plurality of signal strength measurements and known locations of beacon devices that transmit the wireless radio frequency signals; acquiring, using the computer system, mobility information from one or more mobility sensors included in the mobile computing device, wherein the mobility information includes a plurality of mobility sensor measurements that are each associated with a respective mobility sensor measurement time; generating, using the computer system, a mobility-based localization by localizing, using a mobility-based localization algorithm, the mobile computing device based on the plurality of mobility sensor measurements; fusing, using the computer system and based on a fusion algorithm, the wireless signal-based localization and the mobility-based localization based on correspondence between the respective wireless signal measurement time for the at least the portion of the signal strength measurements and the respective mobility sensor measurement time for the at least the portion of the mobility sensor measurement time to generate a fused mobile computing device localization; and storing, using the computer system, the fused mobile computing device localization in a computer-readable media in communication with the computer system.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
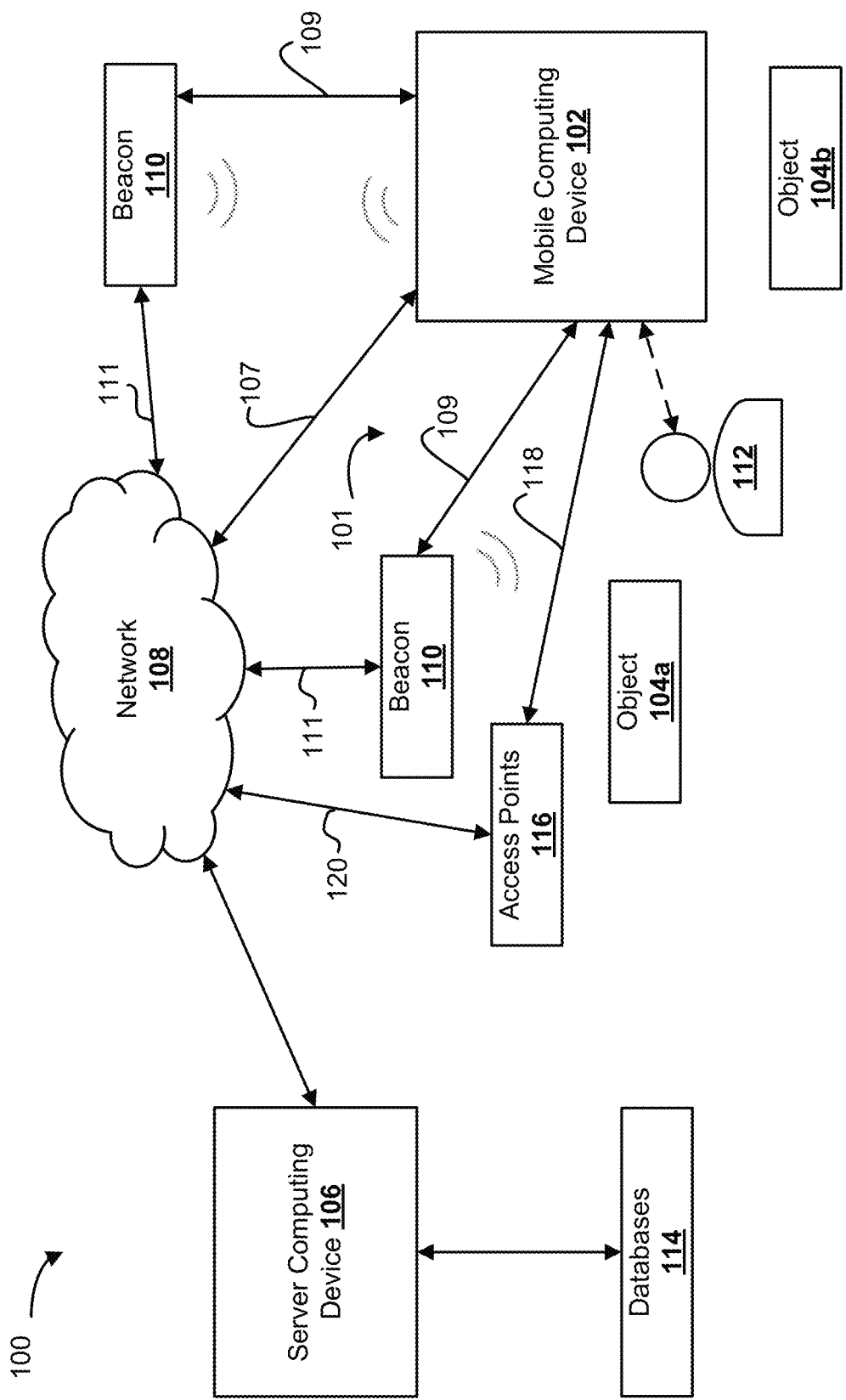
FIG. 1 is a diagram of a positioning system in which various entities may be tracked using the present techniques, in accordance with some embodiments.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of mobile computing device positioning in a monitored environment (e.g., indoor localization) and monitored environment modeling. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

Many monitored environment localization techniques and systems are not very accurate when determining a location of a mobile computing device or tracking that mobile computing device within a monitored environment (e.g., an indoor and/or outdoor space). This is especially true of monitored environment localization techniques that localize a mobile computing device based on signal strength measurements of wireless radio frequency signals generated by beacons, access points, or other wireless radio frequency emitters measured by the mobile computing device or based on signal strength measurements of wireless radio frequency signals generated by the mobile computing device itself. For example, localizations using Received Signal Strength Indicators (RSSI) measurements of radio frequency signals generated according to a Bluetooth protocol or IEEE 802.11 protocols (Wi-Fi), are highly inaccurate due to dynamic environments, unpredictable fading characteristics of the wireless channel, and the number and configuration of the beacons, the access points, and/or other emitter devices.

Sensor fusion algorithms have been introduced to improve accuracy of Bluetooth wireless signal-based localizations. Sensor fusion algorithms often use another source of location data. For example, sensor fusion schemes such as Kalman Filter and Extended Kalman Filter have been developed to improve the accuracy of Bluetooth-based localizations. However, these solutions still do not achieve room-level accuracy that is desired in monitored environment localizations. Also, these schemes require large data sets and are computationally expensive requiring a large amount of memory, storage, and processing resources that are not practical in some systems or are time intensive.

Embodiments of the present disclosure make technological improvements to mobile computing device localizations by generating a fused mobile computing device localization that reduces the computational costs and increases accuracy with respect to conventional mobile computer device localizations. The fused mobile computing device localization of the present disclosure uses a fusion algorithm that fuses a wireless signal-based localization with a mobility-based localization. Specifically, embodiments of the fusion algorithm may include an Iterative Closest Point (ICP) algorithm to fuse the mobility-based localization and the wireless signal-based localization. Embodiments of the wireless signal-based localization may include a centroid localization scheme to estimate a wireless channel's parameter for RSSI based localization. Also, instead of a trilateration method for localization, in some embodiments, a grid-based search that reduces the bias of localization in corner areas where higher localization error is usually observed may be used. Embodiments of the mobility-based localization may use mobility measurements from an Inertial Measurement Unit (IMU) (e.g., accelerometer measurements, gyroscope measurements, barometer measurements, magnetometer measurements, and/or other mobility-based measurements) with a dead reckoning algorithm such as, for example, a step detection algorithm to estimate a mobility pattern of the mobile computing device. As such, the wireless signal-based localization may achieve greater localization accuracy with fluctuations due to fading of the indoor channel, and the mobility-based localization may achieve accurate and smooth mobility information without actual location information and with minimal drift and error due to the mobile computing device's sensitivity to orientation and sudden change in orientation. The ICP algorithm may determine a transformation between the two sets of localization points to minimize the sum of their Euclidean differences to have a smooth and accurate fused mobile computing device localization.

Furthermore, embodiments of the present disclosure may include systems and methods for generating a monitored environment fingerprint model of the monitored environment without labor intensive data collection as is required in conventional environment mapping systems. In some embodiments, the fingerprint model may be generated on the user computing device traversing the environment, a server/cloud-based system or a combination of both. The main advantage of the monitored environment fingerprint model of the present disclosure is that the passive data collection for training, allows for deployment of the proposed solution in large scale environments and allows for relatively faster updating of the monitored environment fingerprint model if there is a change in the monitored environment than the manual data collection when generating a monitored environment fingerprint model. The monitored environment fingerprint model may be generated using a fused mobile computing device localization such as, for example, the fused mobile computing device localization described above. However, other fused mobile computing device localizations may be contemplated. The monitored environment fingerprint model may be approached as a classification problem. For example, the monitored environment fingerprint model is trained by collecting enough samples of some features for a given point in the monitored environment and to estimate a posterior probability of the location (e.g., area, zone, room) for a given measurement or feature vector. Using passive and collaborative data collection across different devices can achieve similar performance without the burden of manual data collection and fast retraining when needed. An advantage of this method is that it allows the system to build a fingerprint model that improves the performance of the RSSI-based localization gradually and significantly. More specifically, for a given set of points with known coordinates (e.g. a conference room, points on the hallway, or other points in the monitored environment.), the proposed ICP-based localization method can help to collect the most probable distribution of RSSI, when the estimated location is the closest to the given points with known coordinates.

When building the monitored environment fingerprint model for a given room or other area within the monitored environment, some embodiments of the present disclosure may use only fused mobile computing device localization whenever the estimated location of that fused mobile computing device localization is located inside a defined boundary while not using those that fall outside that defined boundary. Those selected fused mobile computing device localizations are labeled to the particular area in which they are located and provided to a machine learning algorithm (e.g., an artificial neural network) to generate and/or update a monitored environment fingerprint model. Room/area classifications may be reliably identified, and the monitored environment fingerprint model may be used to generate or update maps of the monitored environment for future use or for use by other mobile computing device when those maps are used for navigation purposes, security purposes, and the like. This allows deployment of the proposed solution in large scales and quick updating of the monitored environment fingerprint model and/or map if there is a change in the environment.

Furthermore, the systems and methods of the present disclosure make technological improvements to mobile computing device localizations by generating and using a fingerprint model in conjunction with a path-loss based localization to determine a location of a mobile comping device in a monitored environment. The fingerprint model may be generated using historical signal strength data rather than obtaining signal strength measurements at known locations to generate the fingerprint model as is done in conventional systems. As such, the systems and methods of the present disclosure eliminate the need for manual data collection when generating a fingerprint model, can quickly update the fingerprint model after an environmental change, augment missing data, is scalable in implementation and deployment, and has higher location accuracy than conventional path-loss based localization solutions. While particular improvements are described herein, other technological improvements will be apparent to those of skill in the art in possession of the present disclosure and are thus not meant to be limiting.

Referring now to FIG. 1, a block diagram of a positioning system 100, consistent with various embodiments is illustrated. In various embodiments, the positioning system 100 may include a mobile computing device 102 provided in a monitored environment 101. The monitored environment 101 may be any indoor and/or outdoor space that may be contiguous or non-contiguous. For example, the monitored environment 101 may include a yard, a home, a business, a park, a stadium, a museum, an amusement park, an access space, an underground shaft, an office building, an airport, a city, a neighborhood, a golf course, or other environments that would be apparent to one of skill in the art in possession of the present disclosure. The monitored environment 101 may be defined by geofencing techniques that may include specific geographic coordinates such as latitude, longitude, and/or altitude, and/or operate within a range defined by a wireless communication signal. The monitored environment 101 may include a plurality of objects such as an object 104a and an object 104b. The objects 104a and/or 104b may include a wall, a table, a chair, a desk, a fence, a door, a tree, a partition, a counter, a pond, and/or any other object that may be in the monitored environment 101 that would be apparent to one of skill in the art in possession of the present disclosure. In various embodiments, the positioning system 100 includes a server computing device 106 in communication with the mobile computing device 102 over a network 108 via one or more access points 116. The positioning system 100 may also include one or more beacons 110. Also, in various embodiments, the mobile computing device may be associated with a user 112

In various embodiments, the mobile computing device 102 may be implemented using any appropriate combination of hardware and/or software configured for wired and/or wireless communication over the network 108. For example, the mobile computing device 102 may be implemented as a wireless telephone (e.g., smart phone), a tablet, a personal digital assistant (PDA), a notebook computer, a personal computer, a connected set-top box (STB) such as provided by cable or satellite content providers, or a video game system console, a head-mounted display (HVID), a watch, an eyeglass projection screen, an autonomous/semi-autonomous device, a vehicle, an Unmanned Arial Vehicle (UAV), a robotic device, a user badge, and/or other mobile computing devices that would be apparent to one of skill in the art in possession of the present disclosure. In various embodiments, the mobile computing device 102 may include any appropriate combination of hardware and/or software having one or more processors and capable of reading instructions stored on a tangible non-transitory machine-readable medium for execution by the one or more processors. Consistent with some embodiments, the mobile computing device 102 includes a machine-readable medium, such as a memory (not shown) that includes instructions for execution by one or more processors (not shown) for causing the mobile computing device 102 to perform specific tasks. In some embodiments, the instructions may be executed by the one or more processors in response to interaction by the user 112.

The mobile computing device 102 may include a communication system having one or more transceivers to enable the mobile computing device 102 to communicate with other mobile computing devices, the server computing device 106, the beacons 110, and/or the access points 116. As disclosed in further detail below, the mobile computing device 102 may be in communication with systems directly or indirectly. As used herein, the phrase "in communication," including variances thereof, encompasses direct communication and/or indirect communication through one or more intermediary components and does not require direct physical (e.g., wired and/or wireless) communication and/or constant communication, but rather additionally includes selective communication at periodic or aperiodic intervals, as well as one-time events.

For example, the mobile computing device 102 in the positioning system 100 of FIG. 1 may include first (e.g., relatively long-range) transceiver(s) to permit the mobile computing device to communicate with the network 108 via a communication channel 107, respectively. In various embodiments, the network 108 may be implemented as a single network or a combination of multiple networks. For example, in various embodiments, the network 108 may include the Internet and/or one or more intranets, landline networks, wireless networks, and/or other appropriate types of communication networks. In another example, the network 108 may comprise a wireless telecommunications network adapted to communicate with other communication networks, such as the Internet. The wireless telecommunications network may be implemented by an example mobile cellular network, such as a long-term evolution (LTE) network or other third generation (3G), fourth generation (4G) wireless network, fifth-generation (5G) wireless network and/or any subsequent generations. However, in some examples, the network 108 may be additionally or alternatively be implemented by one or more other communication networks, such as, but not limited to, a satellite communication network, a microwave radio network, and/or other communication networks.

The mobile computing device 102 additionally may include second (e.g., short-range relative to the range of the first transceiver) transceiver(s) to permit the mobile computing device 102 to communicate with each other mobile computing devices and/or the beacons 110 via a communication channel 109. In the illustrated example of FIG. 1, such second transceivers are implemented by a type of transceiver supporting short-range (i.e., operate at distances that are shorter than the long-range transceivers) wireless networking. For example, such second transceivers may be implemented by Wi-Fi transceivers (e.g., via a Wi-Fi Direct protocol), Bluetooth® transceivers, infrared (IR) transceiver, and other transceivers that are configured to allow the mobile computing device 102 to intercommunicate with other mobile computing devices via an ad-hoc or other wireless network, communicate with the beacons 110, and/or communicate with the access points 116.

For example, the beacons 110 may be installed at the monitored environment 101 where the user 112 may be able to check-in to navigate the monitored environment 101 using the beacons 110. In some embodiments, the beacons 110 may be Bluetooth® Low Energy (BLE) beacons. BLE is a technology that transmits information at a frequency of about 2.4 GHz (about 2042-2480 MHz) over forty (40) 2-MHz wide channels, and has a range of about 50 meter or about 160 feet. Information transmitted according to the BLE protocol may be transmitted at a rate of about 1 Mbit/s with an application throughput of about 0.27 Mbit/s. In some embodiments, BLE communications may be secured using 128-bit Advanced Encryption Standard (AES) encryption with counter mode with a cipher block chaining message authentication code (CBC-MAC) and user defined security. Further, in some embodiments, BLE communications may utilize adaptive frequency hopping, lazy acknowledgement, a 24-bit cyclic redundancy check (CRC) and 32-bit message integrity check for robustness. Moreover, in some embodiments, BLE-capable devices may consume a fraction of the power of standard Bluetooth® devices due to the protocol allowing low duty cycles, and being designed for applications that may not require continuous data transfer.

In some embodiments, the beacons 110 may transmit one or more sequences of information such that when a device such as the mobile computing device 102 capable of receiving information from the beacons 110 (e.g., via the second transceiver) comes within the range of the beacon 110, the mobile computing device 102 may receive a transmission from the beacon 110 that may include information, data, metadata, and the like that may be displayed by the mobile computing device 102 or used by the mobile computing device 102 to initiate communications with the beacon 110. In some embodiments, the beacon 110 may be in communication with the server computing device 106 over the network 108 through wireless or wired connection 111. The beacon 110 may also transmit information to the mobile computing device 102 using other wireless communication protocols, such as Bluetooth®, Near Field Communications (NFC), Radio Frequency Identification (RFID), and the like. While the beacons 110 are described as BLE beacons or standard Bluetooth beacons, one of skill in the art in possession of the present disclosure will recognize that the beacons 110 may be configured with communication systems that use other radio frequency standards and still fall under the scope of the present disclosure.

In various embodiments, the positioning system 100 includes one or more access points 116. The access points 116 are configured to operate according to the Institute of Electrical and Electronics Engineers (IEEE) 802.11 or 802.11x standard (WiFi). For example, the access points 116 may be provided by Wireless Local Area Network (WLAN) or Wireless Personal Area Network (WPAN) devices. However, one of skill in the art in possession of the present disclosure will recognize that other types of wireless networking devices, wireless beacon devices, and/or other wireless communication devices may utilize features and/or generate information that allow for the functionality as described herein, and thus those other wireless communications devices may replace the access points 116 while falling within the scope of the present disclosure as well. As would be understood by one of skill in the art in possession of the present disclosure, the access points 116 may be positioned anywhere around the monitored environment 101. While a single access point 116 is illustrated, one of skill in the art in possession of the present disclosure will recognize that more access points (e.g., at least three access points if elevation information is not to be used by the positioning system 100 discussed below, and at least four access points 116 if elevation information is to be used by the positioning system 100 discussed below) may be provided around the monitored environment 101 while remaining within the scope of the present disclosure. In some embodiments, the access point 116 may be in communication with the mobile computing device 102 through the wireless connection 118. Also, the access point 116 may be in communication with the server computing device 106 over the network 108 through a wireless or wired connection 120. The access point 116 may provide communications between the network 108 and the mobile computing device 102.

The positioning system 100 also includes or may be in connection with the server computing device 106. For example, the server computing device 106 may include one or more server devices, storage systems, cloud computing systems, and/or other computing devices (e.g., desktop computing device(s), laptop/notebook computing device(s), tablet computing device(s), mobile phone(s), etc.). In various embodiments, server computing device 106 may also include any appropriate combination of hardware and/or software having one or more processors and capable of reading instructions stored on a tangible non-transitory machine-readable medium for execution by the one or more processors. Consistent with some embodiments, the mobile computing device 102 includes a machine-readable medium, such as a memory (not shown) that includes instructions for execution by one or more processors (not shown) for causing the mobile computing device 102 to perform specific tasks. In some embodiments, the instructions may be executed by the one or more processors in response to interaction by the user 112. The server computing device 106 may also be maintained by an entity with which sensitive credentials and information may be exchanged with the mobile computing device 102. The server computing device 106 may further be one or more servers that hosts applications for the mobile computing device 102. The server computing device 106 may be more generally a web site, an online content manager, a service provider, and/or other entity who provides content and/or services to the user 112. The server computing device 106 may include various applications and may also be in communication with one or more external databases 114, that may provide additional information that may be used by server computing device 106. As discussed below, the server computing device 106 may be coupled to a database 114 that is configured to provide storage for various models, maps, algorithms, localizations, and/or other data and/or applications, discussed below. In some embodiments, the databases 114 may be databases maintained by third parties, and may include third party account information of the user 112.

Figure 2:
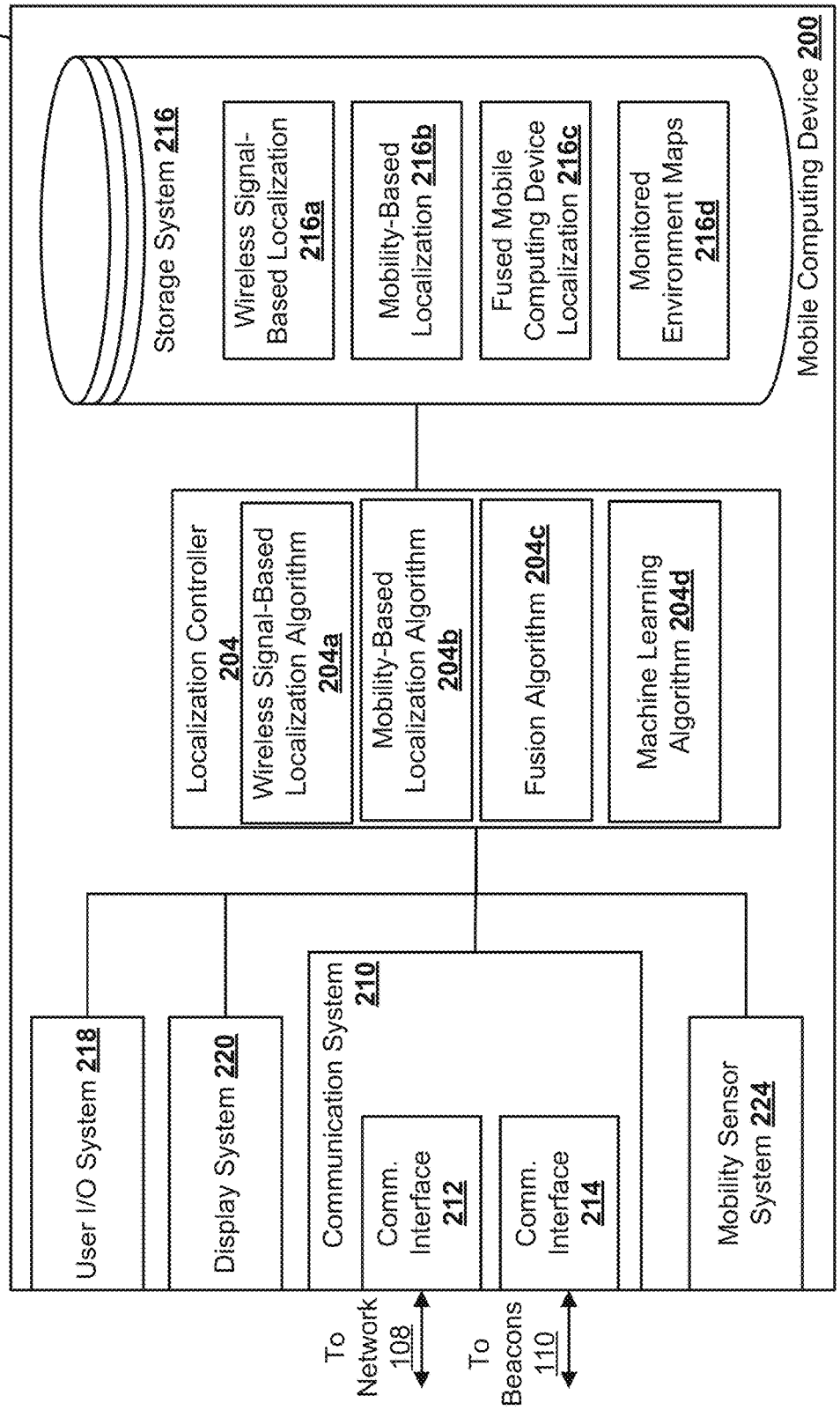
FIG. 2 is a block diagram of a mobile computing device included in the positioning system of FIG. 1, in accordance with some embodiments.

Referring now to FIG. 2, an embodiment of a mobile computing device 200 is illustrated that may be the mobile computing device 102 discussed above with reference to FIG. 1. In the illustrated embodiment, the mobile computing device 200 includes a chassis 202 that houses the components of the mobile computing device 200. Several of these components are illustrated in FIG. 2. For example, the chassis 202 may house a processing system (not illustrated) and a non-transitory memory system (not illustrated) that includes instructions that, when executed by the processing system, cause the processing system to provide a localization controller 204 that is configured to perform the functions of the localization controller and/or the mobile computing devices discussed below. In the specific example illustrated in FIG. 2, the localization controller 204 is configured to provide a wireless signal-based localization algorithm 204a, a mobility-based localization algorithm 204b, a fusion algorithm 204c, that performs fused mobile computing device localization, or a machine learning algorithm 204d.

The chassis 202 may further house a communication system 210 that is coupled to the localization controller 204 (e.g., via a coupling between the communication system 210 and the processing system). The communication system 210 may include software or instructions that are stored on a computer-readable medium and that allow the mobile computing device 200 to send and receive information through the communication networks discussed above. For example, the communication system 210 may include a communication interface 212 to provide for communications through the network 108 as detailed above (e.g., first (e.g., long-range) transceiver(s)). In an embodiment, the communication interface 212 may include a wireless antenna that is configured to provide communications with IEEE 802.11 protocols (Wi-Fi), cellular communications, satellite communications, other microwave radio communications and/or communications. The communication system 210 may also include a communication interface 214 (e.g., the second (e.g., short-range) transceiver(s)) that is configured to provide direct communication with other mobile computing devices, sensors, storage devices, the beacons 110 of FIG. 1 and other devices within the monitored environment 101 discussed above with respect to FIG. 1. For example, the communication interface 214 may include a wireless antenna that configured to operate according to wireless protocols such as Bluetooth®, Bluetooth® Low Energy (BLE), near field communication (NFC), infrared data association (IrDA), ANT®, Zigbee®, Z-Wave® IEEE 802.11 protocols (Wi-Fi), and/or other wireless communication protocols that allow for direct communication between devices.

The chassis 202 may house a storage device (not illustrated) that provides a storage system 216 that is coupled to the localization controller 204 through the processing system. The storage system 216 may be configured to store a wireless signal-based localization 216a, a mobility-based localization 216b, a fused mobile computing device localization 216c, a monitored environment map 216d, monitored environment fingerprint models (not illustrated), and other data, applications, and/or instructions described in further detail below and used to perform the functions described herein.

In various embodiments, the chassis 202 also houses a user Input/Output (I/O) system 218 that is coupled to the localization controller 204 (e.g., via a coupling between the processing system and the user I/O system 218). In an embodiment, the user I/O system 218 may be provided by a keyboard input subsystem, a mouse input subsystem, a track pad input subsystem, a touch input display subsystem, a microphone, an audio system, a haptic feedback system, and/or any other input subsystem. The chassis 202 also houses a display system 220 that is coupled to the localization controller 204 (e.g., via a coupling between the processing system and the display system 220) and may be included in the user I/O system 218. In an embodiment, the display system 220 may be provided by a display device that is integrated into the mobile computing device 200 and that includes a display screen (e.g., a display screen on a laptop/notebook computing device, a tablet computing device, a mobile phone, or wearable device), or by a display device that is coupled directly to the mobile computing device 200 (e.g., a display device coupled to a desktop computing device by a cabled or wireless connection).

The chassis 202 may also house a mobility sensor system 224 that is coupled to the localization controller 204. The mobility sensor system 224 may include an accelerometer, a gyroscope, a magnetometer, a barometric pressure sensor, a temperature sensor, and/or any other sensor for detecting and/or calculating the orientation and/or movement of the mobile computing device 200. For example, the mobility sensor system 224 may include an inertial measurement unit (IMU) that may include the accelerometer, the gyroscope, the magnetometer, and the barometric pressure sensor. The mobility sensor system 224 may output a rotation rate, an acceleration, delta angles, a delta velocity, a barometric pressure, and/or other outputs. The outputs may be used to determine linear acceleration, angular velocity, earth gravity, heading and altitude, and/or other mobility and/or orientation information of the mobile computing device 200 that would be apparent to one of skill in the art possession of the present disclosure.

Figure 3:
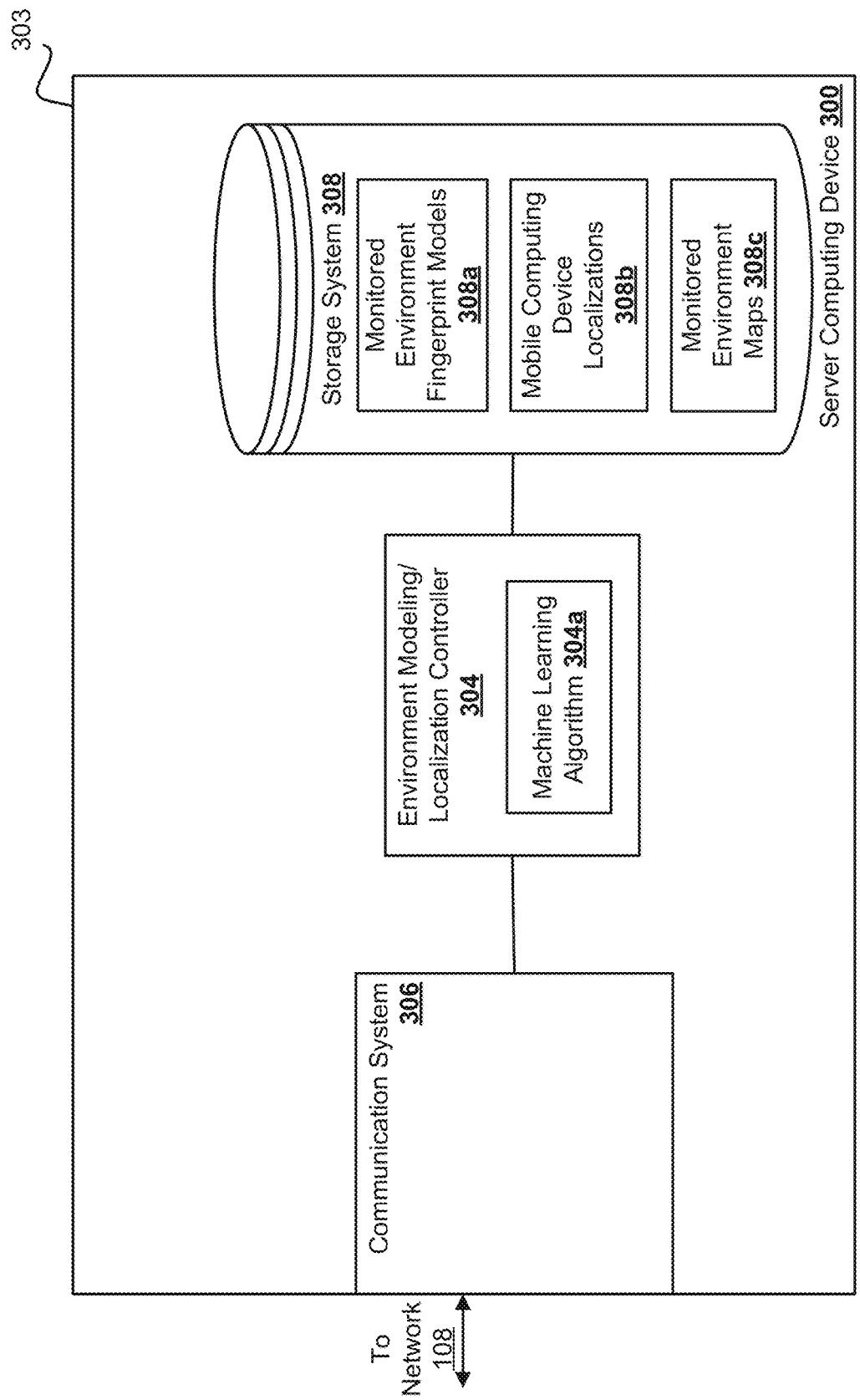
FIG. 3. is a block diagram of a server computing device included in the positioning system of FIG. 1, in accordance with some embodiments.

Referring now to FIG. 3, an embodiment of a server computing device 300 is illustrated that may be the server computing device 106 discussed above with reference to FIG. 1. In the illustrated embodiment, the server computing device 300 includes a chassis 302 that houses the components of the server computing device 300, only some of which are illustrated in FIG. 3. For example, the chassis 302 may house a processing system (not illustrated) and a non-transitory memory system (not illustrated) that includes instructions that, when executed by the processing system, cause the processing system to provide an environment modeling/localization controller 304 that is configured to perform the functions of the modeling controller and/or server devices discussed below. In the specific example illustrated in FIG. 3, the environment modeling/localization controller 304 may be configured to computationally process a monitored environment fingerprint model 308a from one or more mobile computing device localizations 308b and/or raw signal strength information. In other examples, the environment modeling/localization controller 304 may be configured to computationally process a mobile computing device localization. In some embodiments, the environment modeling/localization controller 304 may be coupled, include, or is included in a navigation controller (not illustrated) that is performs navigation functions for navigating the mobile computing device 102 of FIG. 1 through the monitored environment. The environment modeling/localization controller 304 may include a machine learning algorithm 304a used to generate the monitored environment fingerprint models 308a, as discussed in further detail below.

The chassis 302 may further house a communication system 306 that is coupled to the environment modeling/localization controller 304 (e.g., via a coupling between the communication system 306 and the processing system) and that is configured to provide for communication through the network 108 of FIG. 1 as detailed below. The communication system 306 may allow the server computing device 300 to send and receive information over the network 108 of FIG. 1. The chassis 302 may also house a storage device (not illustrated) that provides a storage system 308 that is coupled to the environment modeling/localization controller 304 through the processing system. The storage system 308 may be configured to store monitored environment fingerprint models 308a and mobile computing device localizations 308b (e.g., the wireless signal-based localizations 216a, the mobility-based localizations 216b, and/or the fused mobile computing device localizations 216c) in one or more model repositories. The storage system 308 may also include monitored environment maps 308c of the monitored environment 101 and/or other monitored environments that are each associated with a unique identifier. In various embodiments, the storage system 308 may be provided on the server computing device 300 and/or on the database 114 accessible via the communication system 306

Figure 4:
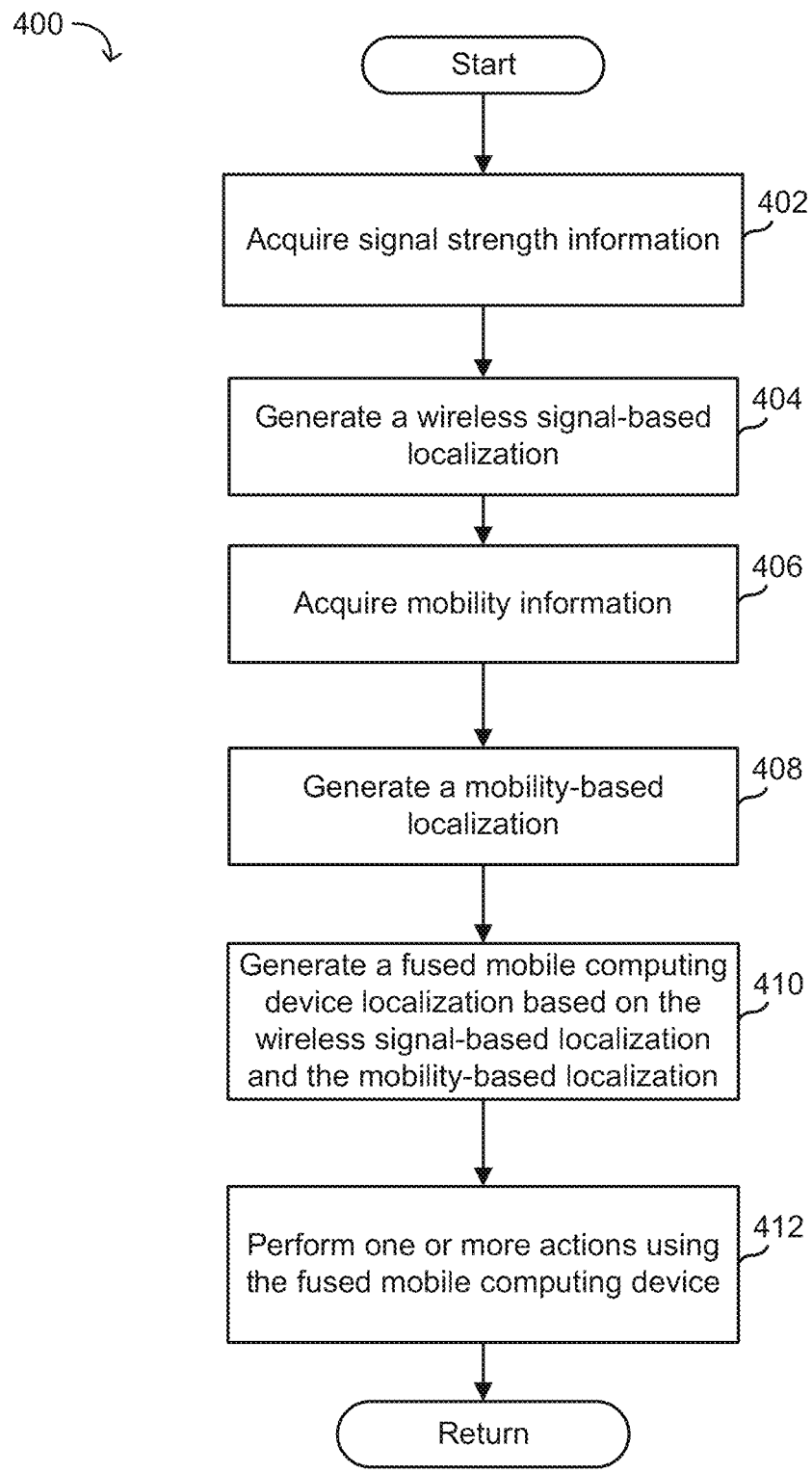
FIG. 4 is a flowchart of a method to determine a fused mobile computing device localization of a mobile computing device in the positioning system of FIG. 1, in accordance with some embodiments.

Referring now to FIG. 4, an embodiment of method 400 of localization fusion is illustrated. The method 400 will be discussed in reference to FIGS. 1, 2, and 3 above. As discussed below, the systems and methods of the present disclosure make technological improvements to mobile computing device localizations by generating a fused mobile computing device localization that reduces the computational costs and increases accuracy with respect to conventional mobile computer device localizations. The fused mobile computing device localization of the present disclosure uses a fusion algorithm that fuses a wireless signal-based localization with a mobility-based localization. Specifically, embodiments of the fusion algorithm may include an Iterative Closest Point (ICP) algorithm to fuse the mobility-based localization and the wireless signal-based localization. Embodiments of the wireless signal-based localization may include a centroid localization scheme to estimate a wireless channel's parameter for RSSI based localization. Also, instead of a trilateration method for localization, in some embodiments, a grid-based search that reduces the bias of localization in corner areas where higher localization error is usually observed may be used. Embodiments of the mobility-based localization may use mobility measurements from an Inertial Measurement Unit (IMU) (e.g., accelerometer measurements, gyroscope measurements, barometer measurements, magnetometer measurements, and/or other mobility-based measurements) with a dead reckoning algorithm such as, for example, a step detection algorithm to estimate a mobility pattern of the mobile computing device. As such, the wireless signal-based localization may achieve greater localization accuracy with fluctuations due to fading of the indoor channel. Furthermore, the mobility-based localization may achieve accurate and smooth mobility information without actual location information. The mobility-based localization may also be obtained with minimal drift and error due to the mobile computing device's sensitivity to orientation and sudden change in orientation. The ICP algorithm may determine a transformation between the two sets of localization points to minimize the sum of their Euclidean differences to have a smooth and accurate fused mobile computing device localization.

The method 400 is described as being performed by the localization controller 204 included on the mobile computing device 102/200. However, it is contemplated that the server computing device 106/300 may include some or all the functionality of the localization controller 204 in its environment modeling/localization controller 304. As such, some or all of the steps of the method 400 may be performed by the server computing device 106/300 and still fall under the scope of the present disclosure.

The method 400 begins at block 402 where signal strength information is acquired. In an embodiment, at block 402, the localization controller 204 on the mobile computing device 102/200 may determine signal strength information that is based on the signal strength of wireless radio frequency signals received via an antenna that is included on the communication interface 214 (e.g., a wireless card that supports a particular radio frequency signal protocol). In various embodiments, the beacons 110 may include a beacon antenna that transmits wireless signals. The antenna included on the communication interface 214 may detect the wireless signals transmitted by one or more of the beacons 110. The communication interface 214 may output the detected signal strength of the received wireless signals as a plurality of signal strength measurements. For example, the signal strength measurements may be based on one or more Received Signal Strength Indicators (RSSI) that are used to refer to a magnitude of the radio frequency signal measured at the antenna included on the communication interface 214. The signal strength measurements may also be associated with a beacon identifier of a respective beacon 110 and/or also with a communication interface identifier associated with the communication interface 214. The beacon identifier, the communication interface identifier, and/or the wireless signal measurement time may be included in the signal strength information and associated with a respective signal strength measurement. In various examples, the beacon identifier may be used by the localization controller 204 to determine a stored beacon location that is identifiably by the beacon identifier, which may be used in the wireless signal-based localization calculations, discussed below. For any given time, the mobile computing device 102/200 may obtain signal strength information associated with a plurality of beacons 110. In the examples discussed herein, the beacons 110 and the communication interface 214 may be configured to communicate via a Bluetooth protocol such as BLE. However, other wireless radio frequency protocols may be contemplated for use by the beacons 110 and the communication interface 214 such that signal strength measurements may be obtained from the reception a wireless radio frequency signal generated according to that protocol and still fall under the scope of the present disclosure.

While the signal strength measurements are described as being obtained by the mobile computing device 102/200 using the communication interface 214 via an antenna that receives beacon wireless signals from one or more of the beacons 110. In other embodiments, the antenna included on the communication interface 214 may transmit a wireless signal and the beacon antenna on one or more of the beacons 110 may receive the wireless signal and that beacon 110 may determine the signal strength measurements (e.g., RSSIs) and associate those RSSIs with a beacon identifier, a communication interface identifier, and/or a wireless signal measurement time. Furthermore, while the beacons 110 are described as transmitting the wireless signal, in various embodiments the access points 116 may transmit the wireless radio frequency signals used to obtain the signal strength information. As such, the beacons 110 and the access points 116 may generally be referred to as location sensors.

The method 400 then proceeds to block 404 where a wireless signal-based localization is generated. In an embodiment, at block 404, the localization controller 204 on the mobile computing device 102/200 may generate a wireless signal-based localization 216a by localizing, using the wireless signal-based localization algorithm 204a, the mobile computing device 102/200 based on the signal strength information that includes a plurality of signal strength measurements and based on known locations of the beacons 110 that transmit the wireless signals. The wireless signal-based localization algorithm 204a may be any localization algorithm that may be able to approximate a location/position of the mobile computing device 102/200 in the monitored environment 101. For example, the wireless signal-based localization algorithm 204a may include a centroid localization algorithm. Specifically, the centroid localization algorithm may include VariLoc for joint path loss exponent (PLE) estimation and localization that utilizes a sensitivity level for correct demodulation on the device receiving the wireless signal as described in "VariLoc: Path Loss Exponent Estimation and Localization Using Multi-Range Beaconing" [Golestanian, M. and Poellabauer, C., 2019. *IEEE Communication Letters* (vol. 23, no. 4, pp. 724-727)], herein incorporated by reference in its entirety. The centroid localization scheme may implement a grid-based search that reduces bias of localization in corner areas where higher localization error is likely to occur. The grid-based localization may be in place of trilateration localization that may have higher localization error in corner areas of the monitored environment 101. However, while a particular wireless signal-based localization algorithm may be contemplated that includes a centroid localization algorithm and/or a grid-based localization algorithm, the systems and method of the present disclosure may implement and benefit from other wireless signal-based localizations. For example, the wireless signal-based localization algorithm may include a trilateration algorithm, other PLE estimation and localization algorithms, Cramér-Rao bound (CRB) analysis, and/or any other wireless signal-based localization algorithm that would be apparent to one of skill in the art in possession of the present disclosure.

Figure 5:
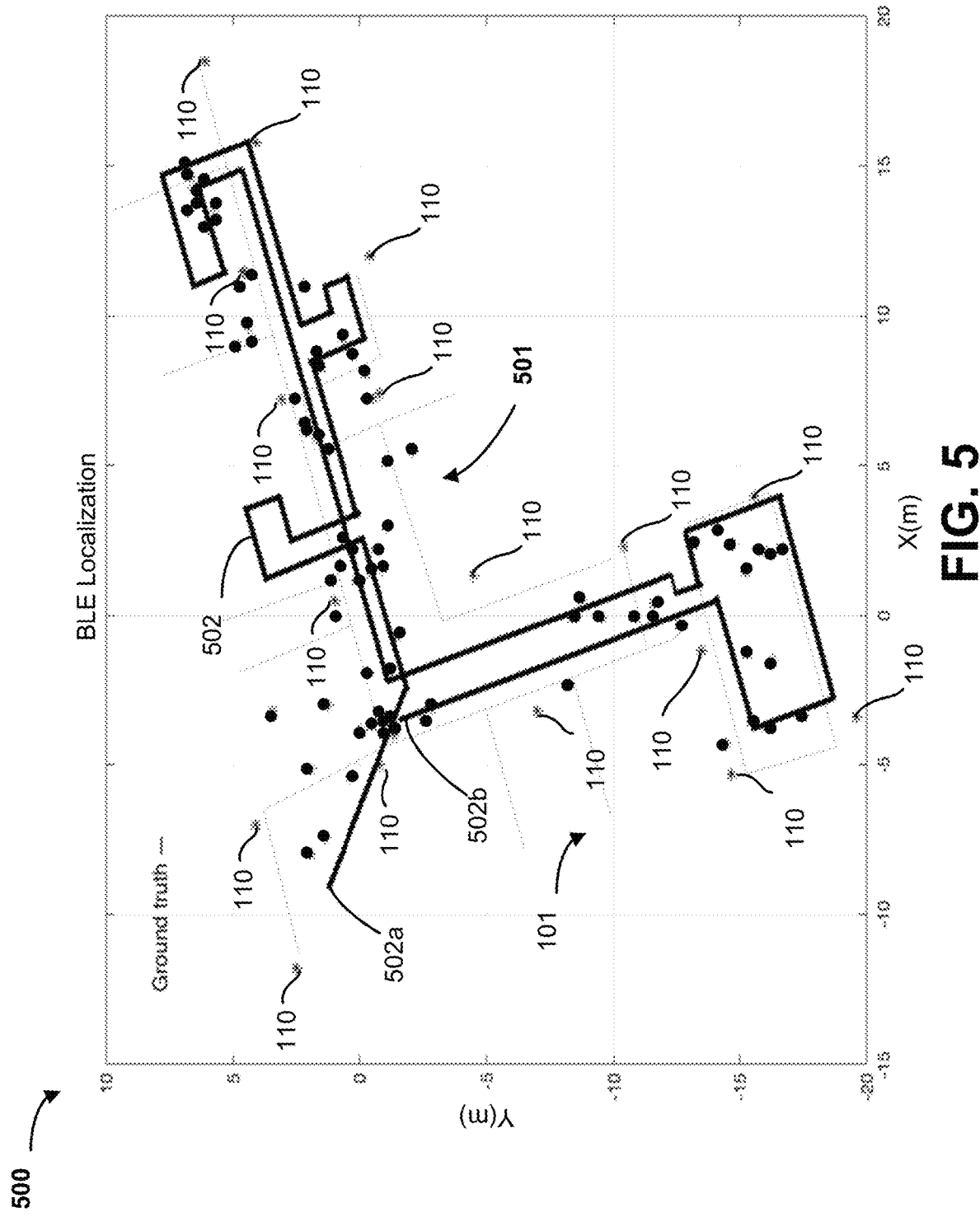
FIG. 5 is a wireless signal-based localization visualization of a wireless signal-based localization generated during the operations of the method of FIG. 4, in accordance with some embodiments.

Referring now to FIG. 5, a wireless signal-based localization visualization 500 is illustrated. The wireless signal-based localization visualization 500 illustrates a wireless signal-based localization 501 determined at block 404 in two-dimensional space. However, it is contemplated that the wireless signal-based localization 501 may include a third dimension. The wireless signal-based localization visualization 500 illustrates the location of the beacons 110 (e.g., 17 beacons) that are located throughout the monitored environment 101. The locations of the beacons 110 may be known and used to localize the mobile computing device 102/200 over a duration of a session at various time intervals during that duration of the session. As illustrated FIG. 5, the wireless signal-based localization 501 may be represented by the unreferenced black dots. Each block dot may represent an individual wireless signal-based localization at a point in time of the session. A path 502 illustrates the actual path of the mobile computing device 102/200 during the session where the session began at a path point 502a and the session concluded at a path point 502b.

The method 400 then proceeds to block 406 where mobility information is acquired from one or more mobility sensors. In an embodiment, at block 406, the localization controller 204 included on the mobile computing device 200/102 may obtain mobility information from the mobility sensor system 224. The mobility information may include a plurality of mobility sensor measurements that are each associated with a respective mobility sensor measurement time. The plurality of mobility sensor measurements may be obtained during the session at which the signal strength measurements were obtained at block 402. As such, each mobility sensor measurement may be obtained at the same time that a corresponding signal strength measurement is taken. However, other embodiments, the signal strength measurements and the mobility sensor measurements may not occur at the same time such that each is associated with a different timestamp. As discussed above the mobility sensor measurements may include accelerometer measurements, gyroscope measurements, magnetometer measurements, and/or other mobility sensor measurements that would be apparent to one of skill in the art in possession of the present disclosure.

The method 400 then proceeds to block 408 where a mobility-based localization is generated by localizing the mobile computing device based on the plurality of mobility sensor measurements. In an embodiment, at block 408, the localization controller 204 included on the mobile computing device 102/200 may generate a mobility-based localization by localizing the mobile computing device 102/200 based on the plurality of mobility sensor measurements included in the mobility information. The localization controller 204 may localize the mobile computing device 102/200 using the mobility-based localization algorithm 204b. The mobility-based localization algorithm 204b may include a dead reckoning algorithm (e.g., a Step Detection algorithm). Dead reckoning algorithm may include a process of calculating a position of the mobile computing device 102/200 by using a determined starting point and advancing that position based on estimated speed, distance, and direction of the mobile computing device 102/200 which in turn is based on acceleration and rotation of the mobile computing device 102/200 included in the mobility sensor measurements.

Dead reckoning may present an issue as inertial measurements can only determine where the mobile computing device 102/200 is relative to where the mobile computing device 102/200 began. Another issue is the concept of 'drifting.' Over time, the further a device traverses, the further the marker will drift from its position. Sensitivity to orientation and sudden change in the orientation of the mobile computing device 102/200 are two main sources of drift and error in dead reckoning localization. While a dead reckoning algorithm is described herein as being included in the mobility-based localization algorithm 204b, other mobility-based localization algorithms that use the mobility sensor measurements of mobility sensors included in the mobility sensor system 224 to indicate a relative position of a mobile computing device 102/200 at a given time and/or a mobility session is contemplated.

Figure 6:
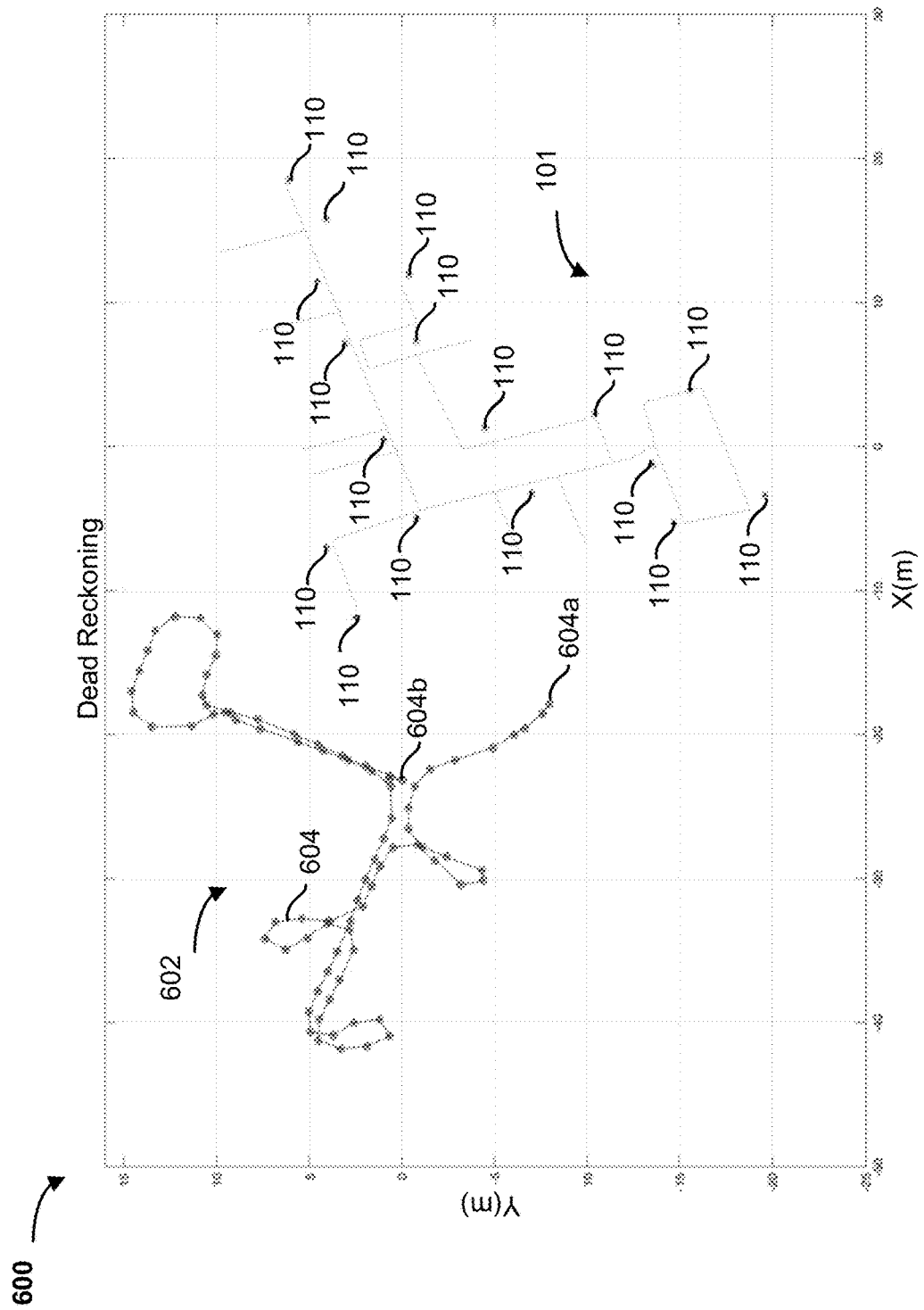
FIG. 6 is a mobility-based localization visualization of a mobility-based localization generated during the operations of the method of FIG. 4, in accordance with some embodiments.

Referring now to FIG. 6, a mobility-based localization visualization 600 is illustrated. The mobility-based localization visualization 600 includes a mobility-based localization 602 for a localization session. The mobility-based localization 602 may include a path 604 that has a path beginning 604a and a path end 604b. The path 604 may be determined based on mobility-based localization values obtained using the dead reckoning algorithm discussed above at different times during the localization session. As can be seen from the mobility-based localization visualization 600, the mobility-based localization 602 has no reference to the monitored environment 101 and is based on the starting point of the localization session (e.g., path beginning 602a).

The method 400 then proceeds to block 410 where a fused mobile computing device localization is generated by fusing the wireless signal-based localization and the mobility-based localization. In an embodiment, at block 410, the localization controller 204 included on the mobile computing device 102/200 may generate a fused mobile computing device localization 216c using the fusion algorithm 204c. The fusion algorithm 204c may be used by the localization controller 204 to fuse the wireless signal-based localization 216a and the mobility-based localization 216b based on correspondence between the respective wireless signal measurement time for the at least the portion of the signal strength measurements and the respective mobility sensor measurement time for the at least the portion of the mobility sensor measurement time. The correspondence between the wireless signal measurement time and the mobility sensor measurement time may be based on matching identical times or times that are within a predefined delta. As such, the fusing of the wireless signal-based localization and the mobility-based localization to generate the fused mobile computing device localization may be based on a time domain. As discussed above, using wireless signal-based localization with BLE may achieve a localization accuracy (e.g., within 2 m) but with fluctuations due to the fading of an indoor channel. The mobility-based localization with dead reckoning may achieve accurate and smooth mobility information but without any position information for the mobile computing device 102/200 in reference to the monitored environment 101 and with some error due to drift. By fusing, using the fusion algorithm 204c, the information provided by both the wireless signal-based localization and the mobility-based localization, the systems and methods of the present disclosure may generate fused mobile computing device localization that includes the benefits from both the wireless signal-based localization and the mobility-based localization while also minimizing the various errors experienced by those localizations.

In various embodiments, the fusion algorithm 204c may include an Iterative Closest Point (ICP) method. The ICP method may find a transformation between two sets of points to minimize the sum of their Euclidean differences. For example, the ICP method may use points generated in the wireless signal-based localization and the mobility-based localization to determine an optimal rotation and translation that must be applied to the mobility-based localization to optimize smoothness and accuracy. The proposed solution improves upon other solution such as Kalman Filter. Embodiments of the present disclosure provide a better user experience by providing a smoother path and least location variance. For example, a step detection algorithm can measure the users' path very accurately (of course with some drift over time and some sensitivity to sudden changes). Thus, the path detected by IMU and the step detection algorithm may be "smooth". On the other hand, the BLE solution, despite the acceptable accuracy, suffers from "fluctuations." Embodiments of the present disclosure are based on ICP that has the capability of assigning higher weight to the IMU path, thereby resulting in much better user's experience (e.g., smooth blue dot mobility). In other words, a path from dead reckoning may be transformed shift/rotate the whole path to the right location based on BLE locations). In similar scenario, the way Kalman filter works is different. The difference is due to main assumptions behind the Kalman filter (e.g., system is linear and the noise is Gaussian)—output is a sort of averaging considering the variance of BLE location and the Path. In fact, with Kalman, the BLE fluctuations have direct impact on the smoothness of the path. Furthermore, the systems and methods of the present disclosure provide better accuracy. Not only are paths smoother, but the accuracy is also improved. Kalman filters assume a Gaussian noise for the system model and measurements. Gaussian noise may become an issue in corners or when the bias of location is not zero (e.g., non-gaussian noise). In this scenario, by assigning a greater weight to the path (e.g., fixing the shape of the path), a reduction in the bias of localization may be achieved. Further still, although a high weight may be assigned to the dead reckoning, the present embodiments provide control over the weight assignment for corner cases (e.g., when no BLE signal is not received for long time or dead reckoning is zero (no mobility)) by adjusting the fusion window (size of samples used for fusion)).

Figure 7:
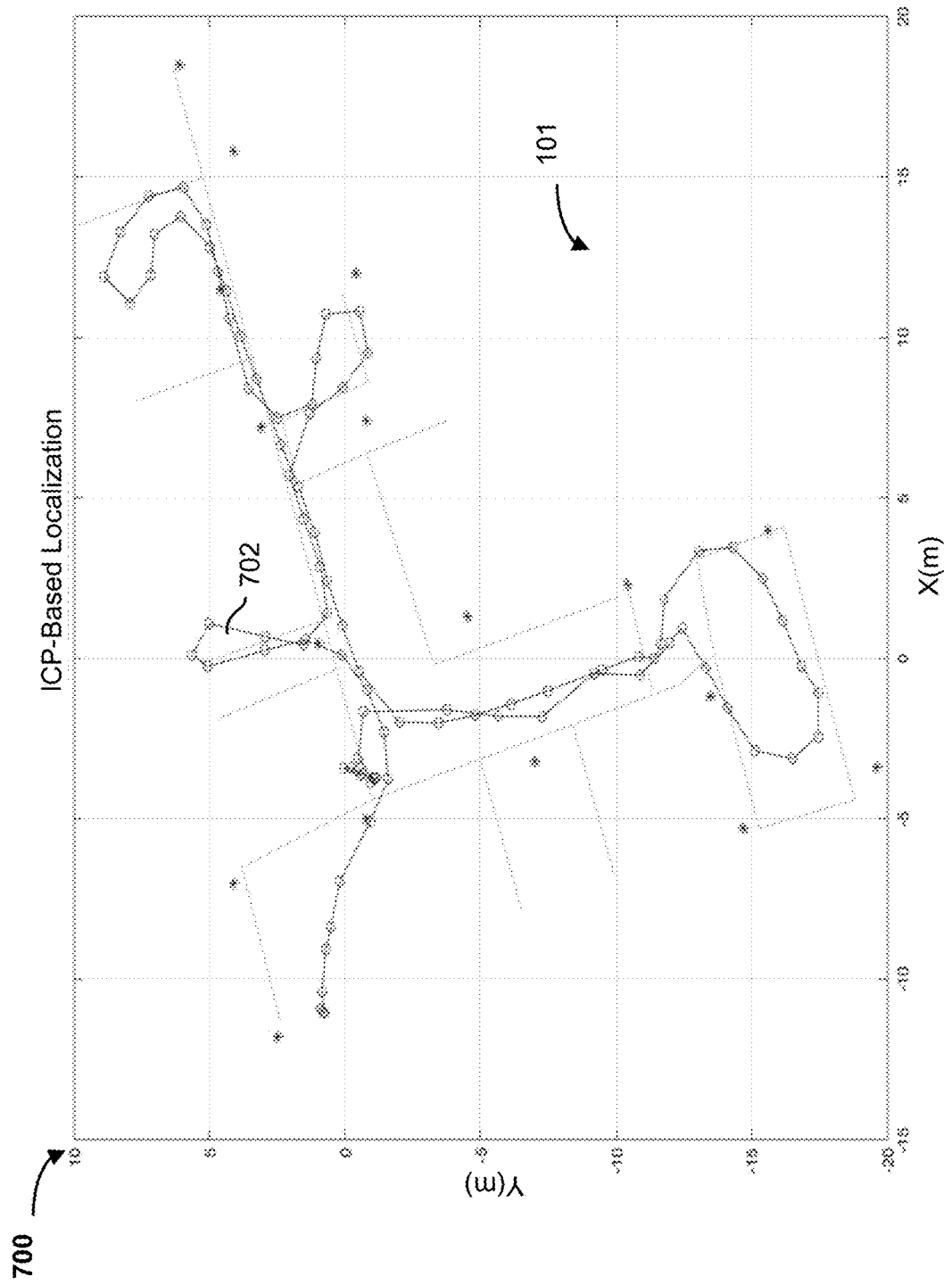
FIG. 7 is a fused mobile computing device localization visualization of a fused mobile computing device localization generated during the operations of the method of FIG. 4, in accordance with some embodiments.

Referring now to FIG. 7, a fused mobile computing device localization visualization 700 is illustrated. The fused mobile computing device localization visualization 700 illustrates a fused mobile computing device localization 702 following the examples above where the wireless signal-based localization 501 of FIG. 5 and the mobility-based localization 602 of FIG. 6 are fused together using the fusion algorithm 204c to generate the fused mobile computing device localization 702. As discussed above, the fusion algorithm 204c may include the ICP method to perform the fusion. As illustrated by FIG. 7, the fused mobile computing device localization 702 more closely resembles the path 502 of FIG. 5, which is a representation of the actual path that the mobile computing device 102/200 traveled in the monitored environment 101.

The method 400 then proceeds to block 412 where one or more actions are performed using the fused mobile computing device localization. In an embodiment, at block 412, the localization controller 204 included on the mobile computing device 102/200 may execute instructions based on the generation of the fused mobile computing device localization 216c. For example, the mobile computing device 102/200 may store the fused mobile computing device localization in a computer-readable media in communication with the mobile computing device 102/200. Specifically, the mobile computing device 102/200 may store the fused mobile computing device localization 216c in the storage system 216 in a fused mobile computing device localization repository. In other embodiments, the mobile computing device 102/200 may provide the fused mobile computing device localization to the server computing device 106/300 via the communication interface 212 and the network 108 such that the server computing device 106/300 stores the fused mobile computing device localization in the mobile computing device localization 308b, which may be included in the storage system 308 and/or the database 114.

In other examples of actions performed using the fused mobile computing device localization, the localization controller 204 included on the mobile computing device 102/200 may display the fused mobile computing device localization (e.g., the fused mobile computing device localization 702) on a display included in the display system 220. While the fused mobile computing device localization may be displayed by itself, in other embodiments, an environment model (e.g., a map) may be associated with the fused mobile computing device localization. The monitored environment map may be retrieved from the monitored environment maps 308c via the network 108 and/or from the monitored environment maps 216d included on the mobile computing device 200.

In yet other examples, the localization controller 204 included on the mobile computing device 102/200 may provide the fused mobile computing device localization to a navigation system that is included as an algorithm in the localization controller 204, as a service provided on the server computing device 106/300, and/or another server computing device dedicated to providing a navigation system. For example, the localization fusion positioning system may be provided as part of the navigation system that provides a variety of navigation functionality for users. The user 112 of the mobile computing device 102/200 may provide the fused mobile computing device localization as part of their participation in those navigation systems that may be native application-based or web browser-based. The navigation system may retrieve a current location of the mobile computing device 102/300 from the fused mobile computing device localization and then utilize the monitored environment map to determine a navigation path through the monitored environment 101 from the current location to a destination location identified by the user 112. The navigation system may then provide the navigation path and the monitored environment map for display via the display system 220. While a few examples of performing an action using the fused mobile computing device localization have been described, one of skill in the art in possession of the present disclosure will recognize that any of a variety of actions may be performed using the fused mobile computing device localization in a variety of manners that will fall within the scope of the present disclosure. In some embodiments, the method 400 may then reset and return to block 402 for further iterations of the method 400.

Figure 8:
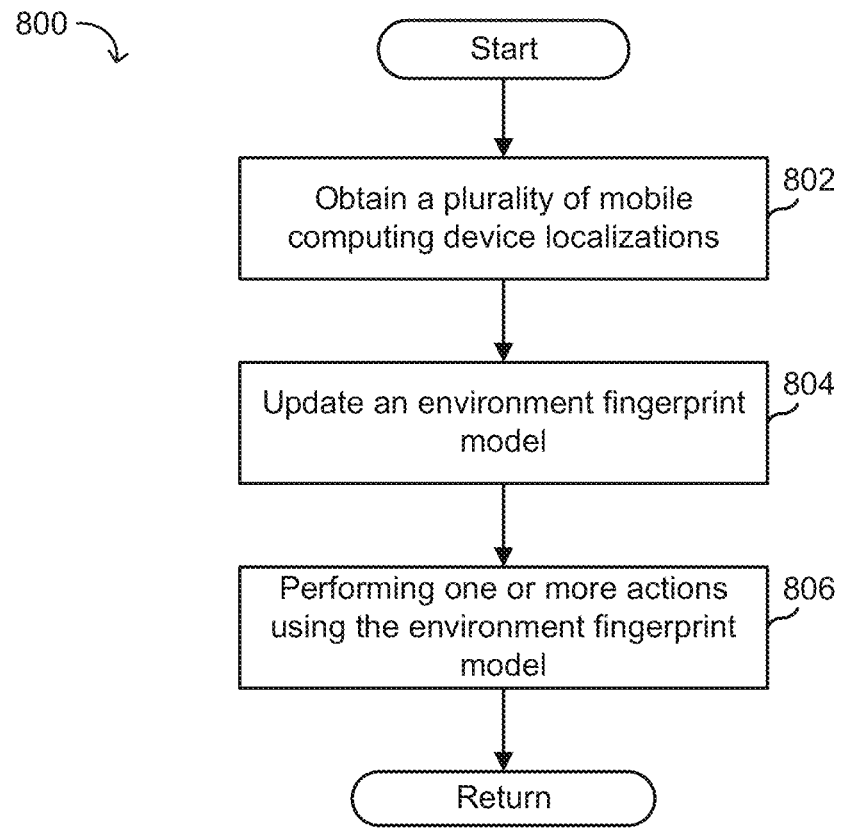
FIG. 8 is a flowchart of a method to determine a monitored environment fingerprint model of a monitored environment included in the positioning system of FIG. 1, in accordance with some embodiments.

Referring now to FIG. 8, an embodiment of method 800 of environment fingerprint model generation is illustrated. The method 800 will be discussed in reference to FIGS. 1, 2, and 3 above. Systems and methods of the present disclosure provide for generating a monitored environment fingerprint model of the monitored environment without labor intensive data collection and quick updating and retraining capabilities as is required in conventional environment mapping systems. One of skilled in the art will recognize that conventional fingerprint models include one or more known points in an environment. A user takes a sampling of signal strengths measurements from a plurality of beacons and/or access points and creates a signal strength "fingerprint" for that point in the environment by averaging or performing some other normalization of the signal strength measurements. For example, a point may be associated with a first signal strength measurement associated with a first beacon, a second signal strength measurement associated with a second beacon, and a third signal strength measurement of a third beacon. At a later time when a device is in the environment and obtains signal strength measurements from the first beacon, the second beacon, and the third beacon that are within a threshold of the first signal strength measurement, the second signal strength measurement, and the third signal strength measurement, then the system will associate that device with the known location. However, conventional fingerprint models are very labor intensive as someone has to collect signal strength measurements from each fingerprint location every time the monitored environment changes otherwise the system becomes very inaccurate.

The main advantage of the monitored environment fingerprint model of the present disclosure is passive data collection for training, allows for deployment the proposed solution in large scales and allows for relatively faster updating of the monitored environment fingerprint model if there is a change in the monitored environment. The monitored environment fingerprint model may be generated using a fused mobile computing device localization such as, for example, the fused mobile computing device localization described above in FIG. 4. However, other fused mobile computing device localizations or other wireless signal-based localizations may be contemplated. In various embodiments, the monitored environment fingerprint model may be approached as a classification problem, where the monitored environment fingerprint model is trained by collecting enough samples of some features for a given point in the monitored environment and to estimate a posterior probability of the location (e.g., area, zone, room) for a given measurement or feature vector. Using passive and collaborative data collection across different devices can achieve similar performance without the burden of manual data collection and fast retraining when needed.

As discussed above with reference to FIG. 4, the proposed ICP-based fusion localization can achieve acceptable accuracy for tracking a mobile computing device. An advantage of this method is that it allows the system to build a fingerprint model that improves the performance of the RSSI-based localization gradually and significantly. More specifically, for a given set of points with known coordinates (e.g. a conference room, points on the hallway, or other points in the monitored environment.), the proposed ICP-based localization method can help to collect the most probable distribution of RSSI when the estimated location is the close to the given points with known coordinates. When building the monitored environment fingerprint model for a given room or other area within the monitored environment, some embodiments of the present disclosure may only use signal strength measurements of ICP-based localizations whenever the location of that ICP-based localization is located inside a defined boundary while not using signal strength measurements of ICP-based localizations that fall outside that defined boundary. Those collected signal strength measurements are labeled to the particular area in which they are located and provided to a machine learning algorithm (e.g., an artificial neural network) to generate and/or update a monitored environment fingerprint model. Room/area classifications may be reliably identified, and the monitored environment fingerprint model may be used to generate or update monitored environment maps for future use or for use by other mobile computing devices when those maps are used for navigation purposes, security purposes, and the like. This allows deployment of the proposed solution in large scales and quick updating of the monitored environment fingerprint model and/or monitored environment map if there is a change in the environment. Other advantages include that the fingerprint models may be generated on the mobile computing devices in the environment or by the server computing device. While particular improvements are described, other technological improvements will be apparent to those of skill in the art in possession of the present disclosure and are thus not meant to be limiting.

The method 800 is described as being performed by the environment modeling/localization controller 304 included on the server computing device 106/300. However, it is contemplated that the mobile computing device 102/200 may include some or all the functionality of the environment modeling/localization controller 304 in its localization controller 204 and machine learning algorithm 204d. As such, some or all of the steps of the method 800 may be performed by the mobile computing device 102/200 and still fall under the scope of the present disclosure.

The method 800 begins at block 802 where a plurality of mobile computing device localizations for one or more mobile computing devices is obtained. In an embodiment, at block 802, the environment modeling/localization controller 304 included on the server computing device 106/300 may obtain a plurality of mobile computing device localizations 308b. A mobile computing device localization of the plurality of mobile computing device localizations 308b may have been determined based on at least a wireless signal-based localization that is generated by localizing, using a wireless signal-based localization algorithm 204a, the mobile computing device 102/204 based on a plurality of signal strength measurements, respective wireless signal measurement times, and known locations of beacon devices that transmit wireless radio frequency signals. As such, the mobile computing device localizations 308b may include the fused mobile computing device localization determined in block 410 of method 400 of FIG. 4, described above. In other embodiments, the mobile computing device localizations 308b may be based on the wireless signal-based localization generated at block 404 of the method 400. However, one of skill in the art in possession of the present disclosure will recognize that the other wireless signal-based localization algorithms may be used to determine the mobile computing device localizations 308b. For example, some wireless signal-based localization algorithms may include Kalman filtering, extended Kalman filtering, particle filtering, or other wireless signal-based localization algorithms.

Further still, the plurality of mobile computing device localizations may be obtained based on device type. Sensor information and signal strength measurements may vary from device type or device manufacture. As such, the mobile computing device localization may be obtained based on mobile computing devices that include a communication interface and one or more mobility sensors that correspond with the communication interface 214 and the mobility sensor system 224 of the mobile computing device 102/200 and/or that obtained based on the mobile computing device satisfying a measurement similarity condition with other mobile computing devices. As discussed above, each mobile computing device localization may be associated with a set of signal strength measurements that includes a signal strength measurement for a respective access point 116 and/or beacon 110 that is obtained by the mobile computing device 102/200

The method 800 the proceeds to block 804 where an environment fingerprint model for a monitored environment is generated using a machine learning algorithm. In an embodiment, at block 804, the environment modeling/localization controller 304 included on the server computing device 106/300 may determine an environment fingerprint model (e.g., an environment fingerprint model of the monitored environment fingerprint models 308a). The environment fingerprint model may be based on the mobile computing device localizations associated with the one or more mobile computing devices (e.g., the mobile computing device 102 of FIG. 1) and associated with the monitored environment 101.

In general, room level accuracy in the monitored environment 101 is difficult to achieve using localization and especially using signal strength methods. However, room level accuracy can be achieved if room level accuracy is approached as a classification problem and using data driven solution such as environment fingerprinting models. The main idea behind training a fingerprinting model is to collect enough samples of some features for a given point (e.g., prior distribution of those features). Once the model is built the next step is to estimate the posterior probability of the location (e.g., area, zone, room, etc.) for a given measurement or feature vector. However, building environment fingerprinting models for localization can be very challenging due to scalability, retraining and updating the environment fingerprinting model. A monitored environment fingerprinting model may be an appropriate solution where using passive and collaborative data collection across different devices can achieve similar performance without the burden of manual data collection and fast retraining when needed. As discussed above with respect to FIG. 4 and the generation of a fused mobile computing device localization in block 410 of FIG. 4, the proposed ICP-based method can achieve acceptable accuracy for tracking a device. One of the advantage of the ICP-based fusion algorithm is to generate a fused mobile computing device localization that allows a system to build a monitored environment fingerprint model that improves the performance of the RSSI-based localization gradually and significantly. More specifically, for a given set of points with known coordinates (e.g. a conference room, points on the hallway, etc.), the proposed ICP-based fusion algorithm can help to collect the most probable distribution of RSSI, when the estimated location is near the given points with known coordinates. The environment fingerprint model may then be generated using a machine learning algorithm 304a included on the environment modeling/localization controller 304 or the machine learning algorithm 204d included on the localization controller of the mobile computing device 200.

Figure 9:
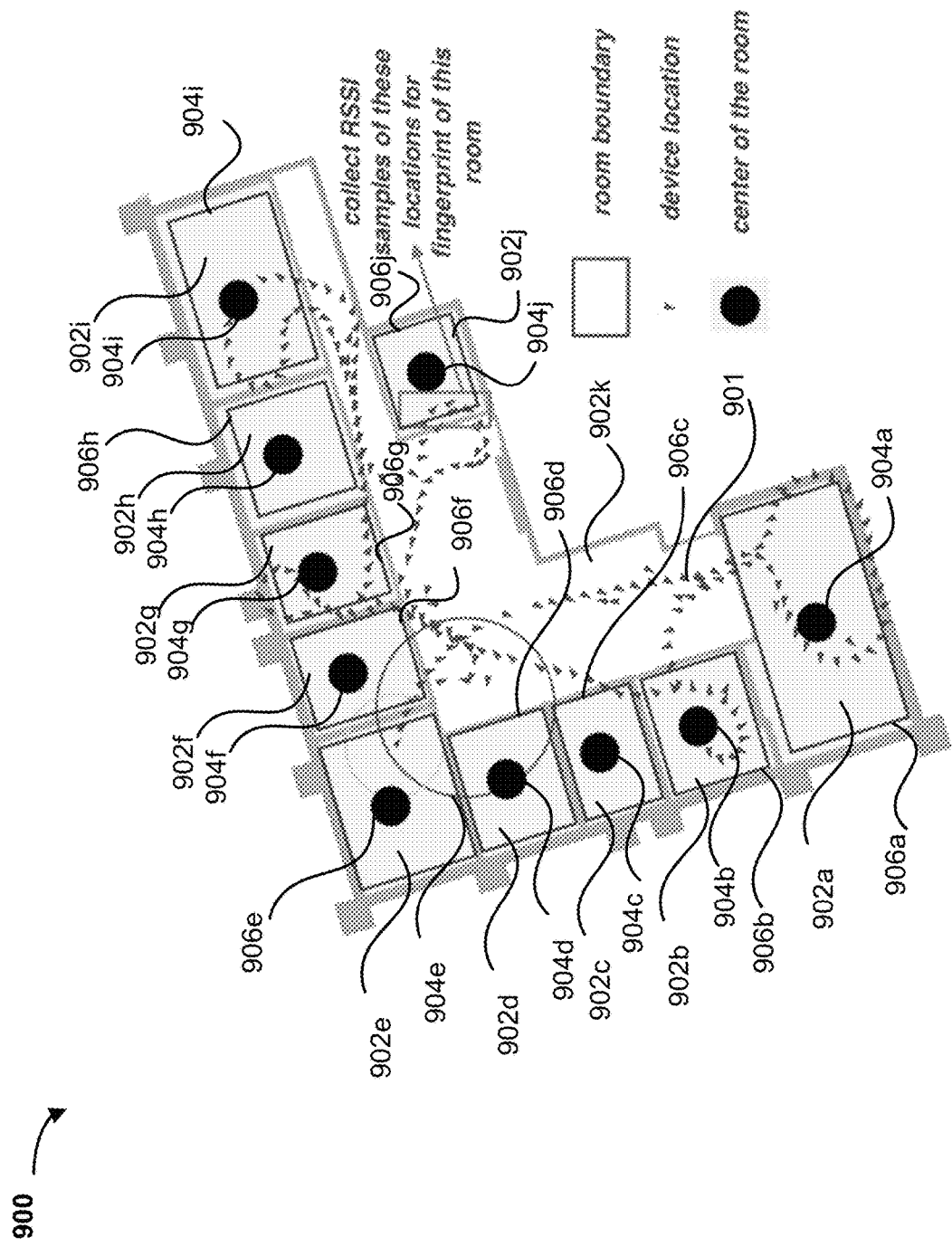
FIG. 9 is a monitored environment map used to determine the monitored environment fingerprint model during the operations of the method of FIG. 8, in accordance with some embodiments.

Referring now to FIG. 9 an example monitored environment map 900 of the monitored environment 101 is illustrated. The monitored environment map 900 may include a mobile computing device localization 901. The monitored environment map 900 includes rooms 902a-902j and hallway 902k. Each of the rooms 902a-902j may be associated with a known respective coordinate 904a-904j (e.g., such as the center of each room 902a-902j). Each room 902a-902j may be associated with respective boundary 906a-906j. As illustrated, the accuracy of the mobile computing device localization 901 may not coincide with the actual path that was taken by user 112 and the mobile computing device 102/200 where some of the path should be located in the rooms but are not. However, when generating the monitored environment fingerprint model, only the localizations that are located within the boundary (e.g., boundary 906a and/or up to 906j) for rooms 902a-902j are considered and those localizations' respective signal strength measurements are associated with the known respective coordinate 904a-904j. Each individual monitored device localization that is within a boundary 906a and/or up to 906j, may be labeled to the respective room in which it is located. Once the labeling is complete, and if there are enough samples for the given room (e.g., rooms 902a-902j), the labeled individual monitored device localizations and their coordinates, the known locations 904a-904j (e.g., coordinates) of the room 902a-902j, and the locations of the boundaries 906a-906j may be provided as inputs into a machine learning algorithm such as an artificial neural network to generate or update a monitored environment fingerprint model.

Figure 10:
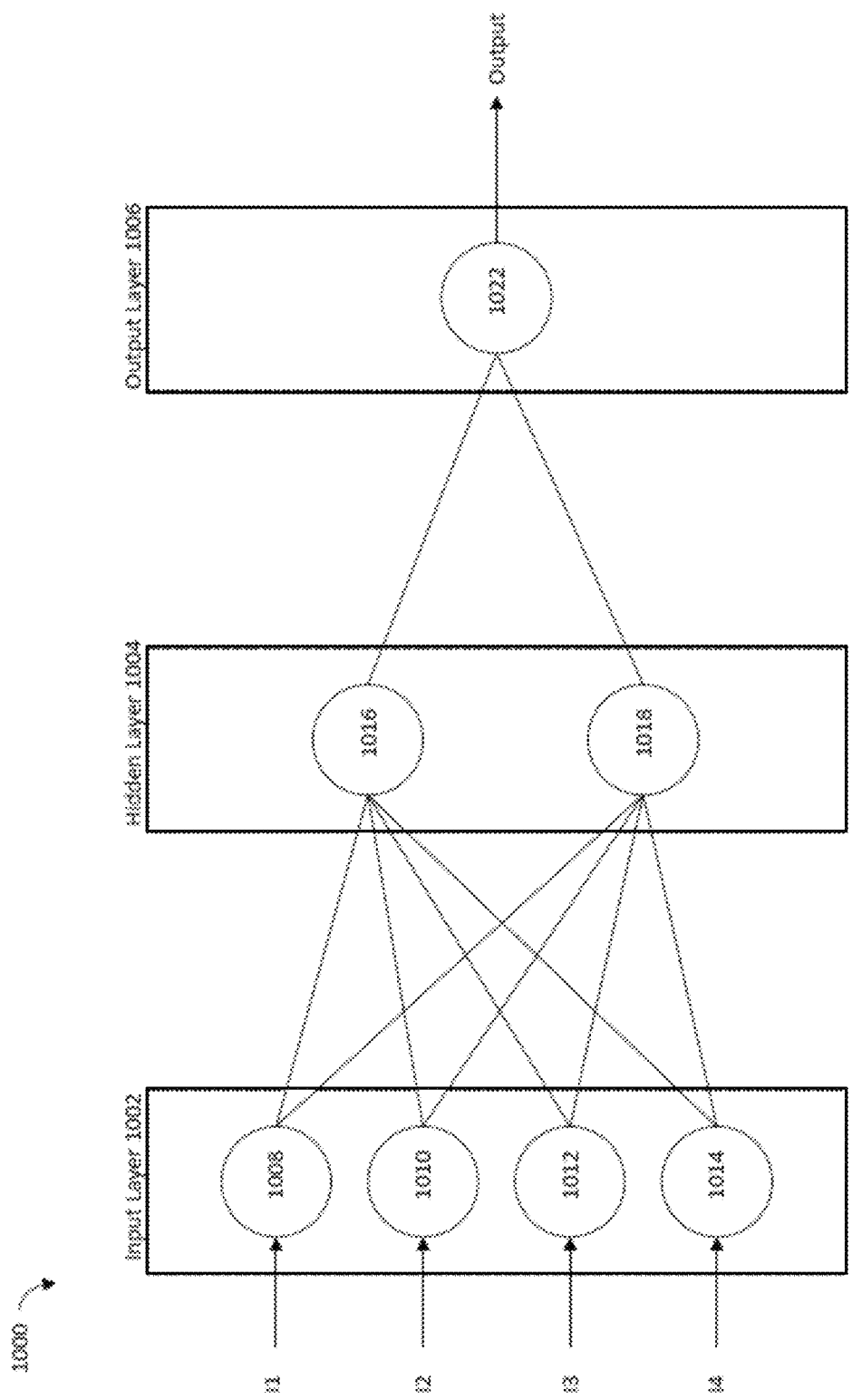
FIG. 10 is an artificial neural network, in accordance with some embodiments.

Referring now to FIG. 10 an artificial neural network according to an embodiment of the present disclosure is illustrated. An example machine learning algorithm 304a may be implemented as an artificial neural network 1000. As illustrated, the artificial neural network 1000 includes three layers—an input layer 1002, a hidden layer 1004, and an output layer 1006. Each of the layers 1002, 1004, and 1006 may include one or more nodes. For example, the input layer 1002 includes nodes 1008-1014, the hidden layer 1004 includes nodes 1016-1018, and the output layer 1006 includes a node 1022. In this example, each node in a layer is connected to every node in an adjacent layer. For example, the node 1008 in the input layer 1002 is connected to both of the nodes 1016-1018 in the hidden layer 1004. Similarly, the node 1016 in the hidden layer is connected to all of the nodes 1008-1014 in the input layer 1002 and the node 1022 in the output layer 1006. Although only one hidden layer is shown for the artificial neural network 1000, it has been contemplated that the artificial neural network 1000 used by the environment modeling/localization controller 304 may include as many hidden layers as necessary. As discussed above, the unsupervised neural network may be provided as the input layer 1002 and multiple hidden layers while the supervised neural network may be provided as multiple hidden layers and the output layer 1006.

In this example, the artificial neural network 1000 receives a set of input values and produces an output value. Each node in the input layer 1002 may correspond to a distinct input value (e.g., a model parameter). For example, the node 1008 may correspond to a first parameter of a model, the node 1010 may correspond to a second parameter of the model, the node 1012 may correspond to a third parameter of the model, and the node 1014 may correspond to the deviation computed for the model.

In some embodiments, each of the nodes 1016-1018 in the hidden layer 1004 generates a representation, which may include a mathematical computation (or algorithm) that produces a value based on the input values received from the nodes 1008-1014. The mathematical computation may include assigning different weights to each of the data values received from the nodes 1008-1014. The nodes 1016 and 1018 may include different algorithms and/or different weights assigned to the data variables from the nodes 1008-1014 such that the nodes 1016-1018 may produce different values based on the same input values received from the nodes 1008-1014. The values generated by the nodes 1016 and 1018 may be used by the nodes 1022 in the output layer 1006 to produce an output value for the artificial neural network 1000.

For example, for a given map (e.g. an office with K room/zones—dimension and center of rooms/zones are known, and N BLE beacons with known location), a device may use described herein to locate itself ($x^*$, $y^*$) using the received RSSI from BLE beacons. To build the fingerprinting using a Neural Network (NN), the following shows the structure of NN and steps for training the NN. The input values associated with the nodes 1008-1014 of the input layer may include N+2 input neurons where N is the number of beacons. The input neurons include the received RSSI vector from N beacons and 2 neurons for estimated location using the proposed localization algorithm. The number of intermediate layers 1004 and neurons in each layer will be determined during the training phase. The node 1022 included in the output layer 1006 may include the layer of the room or may include two nodes showing the (x,y) coordinates of the center of the target room.

For training such a model, a device may listen to the beacons and gets the RSSI vector (ideally from all beacons, but missing RSSI is possible). Using the proposed algorithm, the device estimates its location, (e.g., ($x^*$,$y^*$)). The mobile computing device may discover the closest room/zone to the estimated location ($x^*$, $y^*$). The label of the room that the mobile computing device is inside or closest to the center, determines the class (output layer). The above steps may be repeated until a batch of training data with size of M is obtained Rssi_1,1 . . . Rssi_1,M.
Rssi_2,1 . . . Rssi_2,M.
Rssi_3,1 . . . Rssi_3,M.
C1, C2, . . . , CM
Rssi_N,1 . . . Rssi_N,M.
x_1, x_2, . . . x_M
y_1, y_2, . . . y_M Once the batch of data (input-output) is ready, it is given to NN for training and updating the weight of each layer.

The method 800 then proceeds to block 806 where one or more actions are performed using the monitored environment fingerprint model. In an embodiment, at block 806, the environment modeling/localization controller 304 included on the server computing device 106/300 may execute instructions based on the generation of the monitored environment fingerprint model that store, using the computer system, the environment fingerprint model in a computer-readable media in communication with the computer system. In other embodiments, a monitored environment map may be generated using the monitored environment fingerprint model.

In another embodiment, the environment modeling/localization controller 304 of server computing device 106/300 may generate a monitored environment map 308c using the monitored environment fingerprint model. Furthermore, the environment modeling/localization controller 304 may regenerate increasingly accurate monitored environment maps as the number of stored mobile computing device localizations grow. In addition, the monitored environment fingerprint model may be used to identify the position of the beacons 110 around the monitored environment. While not specifically described herein in detail, a variety of statistical and/or analytical techniques may be utilized in generating the monitored environment map 308c including estimating the locations of inner walls based on distances users are known to move adjacent such walls, identifying windows based on user path details adjacent those windows (e.g., pausing regularly adjacent at such windows), determining locations of seating (e.g., pausing for extended periods of time), as well as other example that would be apparent to one of skill in the art in possession of the present disclosure. In addition, mobility information received from the mobile computing device 102/200 may be used to identify unavailable/obstructed areas (e.g., sensor information received from the mobile computing device 102/200 may indicate that a user is sitting, helping to identify that an unavailable/obstructed area is a chair or table.) As discussed above, the generation of increasingly precise monitored environment maps may be enhanced by associating known locations of the beacons 110 and/or other static features in the monitored environment 101 with coarse monitored environment maps.

One of skill in the in art in possession of the present disclosure will recognize that the monitored environment map 308c may change over time as the determined user paths change to accommodate for changes in the monitored environment 101. For example, the movement of a table, a wall (e.g., a partition such as a "cube" wall), a chair, and/or other objects, will result in users moving along subsequent mobile computing device localizations that avoid those obstructions. As those updated mobile computing device localizations are determined as discussed above using localization methods, the monitored environment fingerprint model will include newly recognized available paths and obstructions in the monitored environment 101, and the environment modeling/localization controller 304 may modify the monitored environment map 308c based on the monitored environment fingerprint model to account for them. As such, the monitored environment fingerprint model is dynamic and/or adaptable in that it may change as the elements of the monitored environment 101 change and users select user paths through that monitored environment 101 in response to those changes.

In yet further embodiments, the action performed using the monitored environment fingerprint model may be to determine an area identity of area(s) on the monitored environment map. The localization controller 204/304 may operate to determine area identities of areas in the monitored environment map. For example, the localization controller 204/304 may be configured to recognize the areas on the monitored environment map that correspond to the available/unobstructed areas in the monitored environment 101 that are bounded by the unavailable/obstructed areas (e.g., the inner walls the monitored environment 101), and then may utilize a variety of statistical and/or analytical techniques or assumptions, as well as access a variety of information, in order to determine an area identity for those areas. In a specific example, the localization controller 204/304 may be configured to recognize areas on the monitored environment 101 that include the available/unobstructed areas bounded by the unavailable/obstructed areas, and that include a single entrance (e.g., as identified by all user paths entering that area through a common location), as a particular type of room, the identity of which may be narrowed down by additional information. For example, mobile computing device 102/200 may also transmit user information about their associated user 112 (e.g., a user identifier such as an employee number, a phone number, and/or other user identifiers), and when the particular type of room is associated with the same user 112 repeatedly being located in that room for extended period of time, that room may be identified as an office room. Furthermore, additional information may allow the localization controller 204/304 to identify the office room as belonging to that particular user (e.g., "Employee A's office"). However, while a few relatively simple specific examples of identifying areas on the monitored environment map have been provided, one of skill in the art in possession of the present disclosure will appreciate that much more advanced/complicated statistical and/or analytical techniques (e.g., machine learning algorithms), as well as more details outside information, may be utilized to determine area identities while remaining within the scope of the present disclosure. Furthermore, as discussed above, the identification of area elements in those areas of the monitored environment 101 using similar techniques will fall within the scope of the present disclosure as well. For example, if the user 112 is co-located with an area element for relatively long periods of time, that are element may be identified (or displayed as) a chair, while if the user 112 spends relatively long periods of time adjacent an area element, that area element may be identified as a desk.

In yet other embodiments, the action using the monitored environment fingerprint model may include localizing a mobile computing device during a deployment phase. For example, a computing device 102/200 that does not include the mobility sensor system 224 may be localized using the monitored environment fingerprint model. As discussed above and according to conventional techniques, a set of signal strength measurements associated with the mobile computing device and the beacons 110 and/or access points 116 may be captured at a particular time. The environment modeling/localization controller 304 and/or the localization controller 204 may compare the set of signal strength measurements to a set of signal strength measurements associated with each fingerprint location included in the monitored environment fingerprint model. If the set of signal strength measurements satisfies a similarity condition (e.g., 95% similar, 90% similar, most similar of all fingerprint locations, and/or other similarity conditions) with the set of signal strength measurements associated with the fingerprint location, the known location of the fingerprint location may be associated with the mobile computing device 102/200 as the location of the mobile computing device 102/200 for that time. While a few specific actions using the monitored environment fingerprint model are described, one of skill in the art in possession of the present disclosure will recognize that the monitored environment fingerprint model may be used in other actions.

Figure 11:
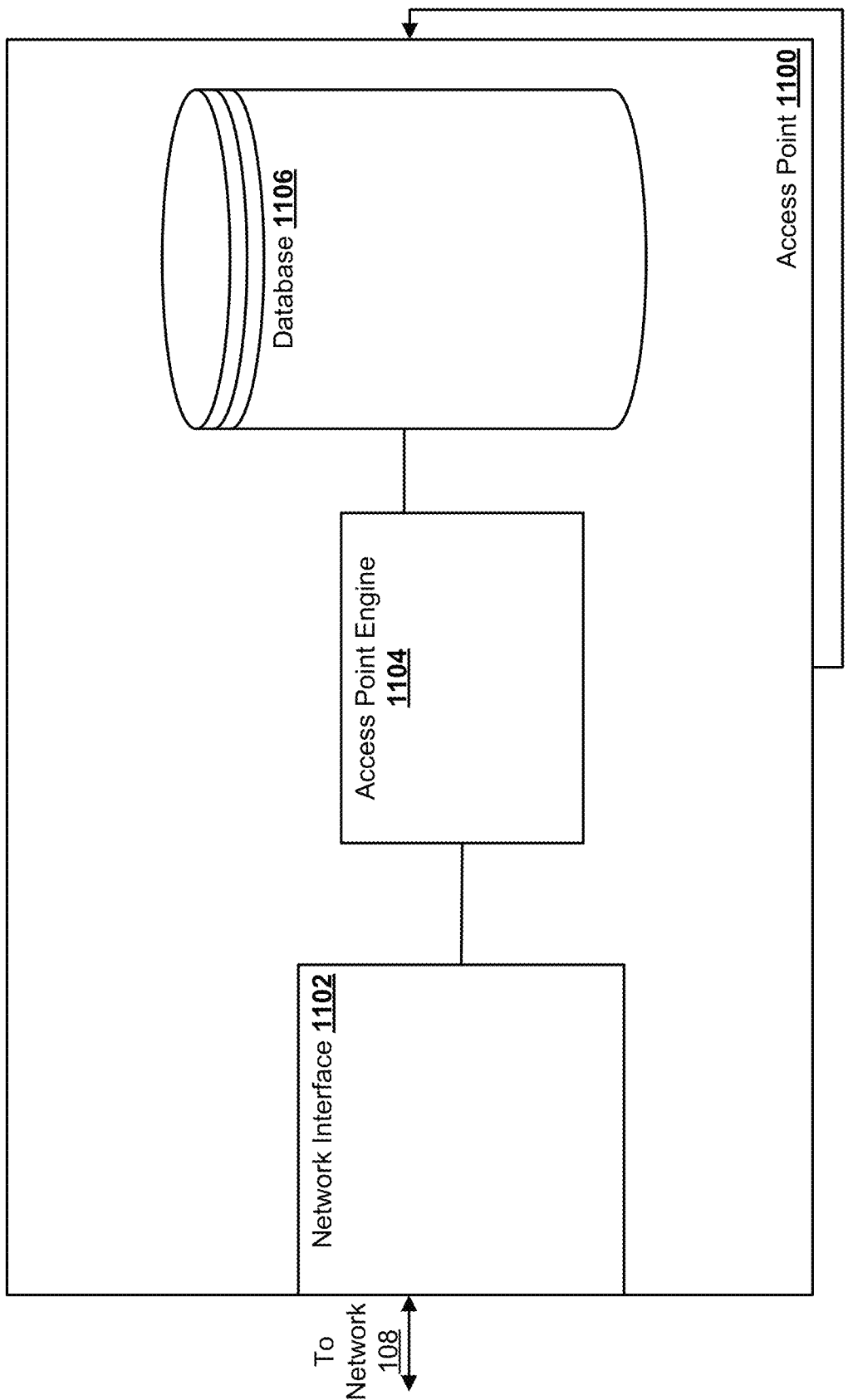
FIG. 11 is a block diagram of access point included in the positioning system of FIG. 1, in accordance with some embodiments.

Referring now to FIG. 11, an embodiment of an access point 1100 is illustrated that may be, for example, any of the access points 116 in the positioning system of FIG. 1, discussed above. The access point 1100 includes a network interface 1102 (e.g., a Network Interface Controller (NIC)) that is configured to couple to a network. The access point 1100 also includes a processing system (not illustrated) and a memory system (not illustrated) that includes instructions that, when executed by the processing system, cause the processing system to provide an access point engine 1104 that operates to perform the functions of the access point engines and access points discussed below. The access point engine 1104 is coupled (e.g., via a coupling to the processing system) to a control database 1106 that may be provided using a non-transitory memory or storage device. In the examples below, the access point engine 1104 is discussed primarily as detecting and gathering signal strength information from mobile computing devices in the monitored environment 101 of FIG. 1, but one of skill in the art will recognize that the access point 1100 may include a plurality of hardware and software components that operate to provide the access point engine 1104 and/or other engines to perform access point functions. For example, the access point engine 1104 may allow wireless devices such as the mobile computing device 102 of FIG. 1 to connect to a wired network (e.g., the network 108) using wireless communication technologies (e.g., WiFi wireless communication technologies).

Figure 12:
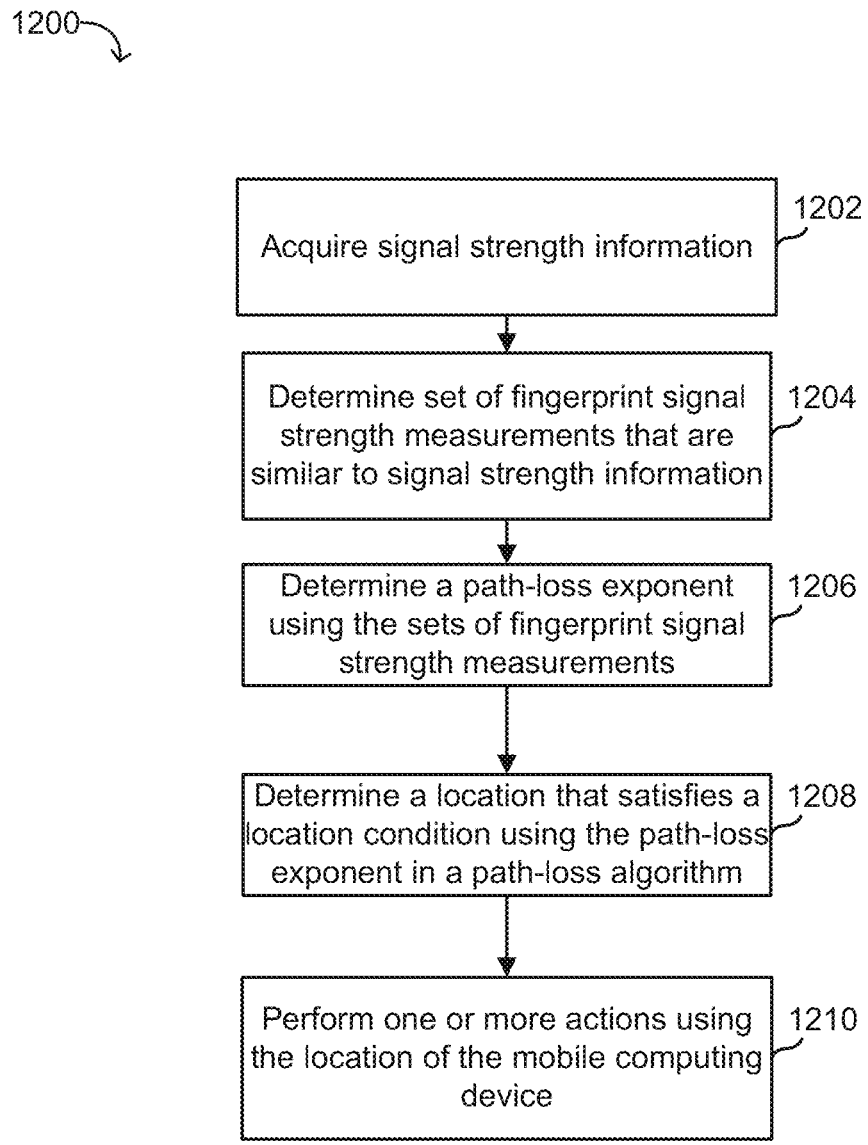
FIG. 12 is a flowchart of a method of mobile computing device localization of a mobile computing device in the positioning system of FIG. 1 using a monitored environment fingerprint model and a path-loss localization, in accordance with some embodiments.

Referring now to FIG. 12, an embodiment of a method 1200 of mobile computing device localization is illustrated. The method 1200 will be discussed in reference to FIGS. 1, 2, 3, and 11 above. As discussed below, the systems and methods of the present disclosure make technological improvements to mobile computing device localizations by generating and using a fingerprint model in conjunction with a path-loss based localization to determine a location of a mobile comping device in a monitored environment. The fingerprint model may be generated using historical signal strength data rather than obtaining signal strength measurements at known locations to generate the fingerprint model as is done in conventional systems. As such, the systems and methods of the present disclosure eliminate the need for manual data collection when generating a fingerprint model, can quickly update the fingerprint model after an environmental change, augment missing data, is scalable in implementation and deployment, and has higher location accuracy than conventional path-loss based localization solutions.

The method 1200 may begin at block 1202 where signal strength information associated with a mobile computing device is obtained. In an embodiment, at block 1202 and with reference to FIG. 13, a mobile computing device 1302 (e.g., the mobile computing device 102 of FIG. 1 and/or the mobile computing device 200 of FIG. 2) may be in a monitored environment 1300 (e.g., the monitored environment 101 of FIG. 1). The monitored environment 1300 also includes an access point 1304a, an access point 1304b, an access point 1304c, an access point 1304d, an access point 1304e, an access point 1304f, and an access point 1304g. Each of the access points 1304a-1304g may include the access point 116 of FIG. 1 and the access point 1100 of FIG. 11. Also, each access point 1304a-1304g may be at a known location (e.g., a 2-dimensional or 3-dimensional set of coordinates) in the monitored environment 1300.

In various embodiments, the access points 1304a-1304g, via their respective access point engines 1104, and/or the mobile computing device 1302, via the localization controller 204, may measure signal strength of a radio frequency signal between the mobile computing device 1302 and each access point 1304a-1304g. In the illustrated monitored environment 1300 of FIG. 13, the mobile computing device 1302 may measure, at a given time, a signal strength of a signal 1306d between the mobile computing device 1302 and the access point 1304d, a signal strength of a signal 1306e between the mobile computing device 1302 and the access point 1304e, a signal strength of a signal 1306f between the mobile computing device 1302 and the access point 1304f, and a signal strength of a signal 1306g between the mobile computing device 1302 and the access point 1304g. In some embodiments, the access points 1304a-1304g may measure the signal strengths. In the illustrated example, the access point 1304d may measure the signal strength of the signal 1306d, the access point 1304e may measure the signal strength of the signal 1306e, the access point 1304f may measure the signal strength of the signal 1306f, and the access point 1304g may measure the signal strength of the signal 1306g. Also, in the illustrated embodiment, there are no signals or connections between the mobile computing device 1302 and the access points 1304a, 1304b, and 1304c.

The signal strength information may include for each signal strength measurement a mobile computing device identifier associated with the mobile computing device 1302, a time of the measurement, a date of the measurement, an access point identifier for the access points 1304d-1304g that are associated with each signal 1306d-1306g, a monitored environment identifier for the monitored environment 1300, location information associated with the access points 1304d-1304g, and/or other information. In some embodiments, the signal strength information may include a set of signal strength measurements for a given time. In the example illustrated in FIG. 13, the localization controller 204 of the mobile computing device 1302 may generate the set of signal strength measurements for signals 1306d-1306g (e.g., $\{S_{1306d}, S_{1306e}, S_{1306f}, S_{1306g}\}$) for a first time.

In other embodiments, the access points 1304d-1304g may each provide their signal strength information to the server computing device 106/300. The environment modeling/localization controller 304 may compile the signal strength information to generate the set of signal strength measurements for the signals 1306d-1306g. For example, the individual signal strength information from each access point 1304d-1304g may be combined based on corresponding mobile computing device identifiers and time such that the server computing device 106/300 generates the set of signal strength measurements for signals 1306d-1306g (e.g., $\{S_{1306d}, S_{1306e}, S_{1306f}, S_{1306g}\}$). In yet other embodiments, the access points 1304a-1304g may share the signal strength information with each other such that one or more of the access points 1304a-1304g compiles the signal strength information from the others to obtain the set of signal strength measurements.

The method 1200 may proceed to block 1204 where one or more sets of fingerprint signal strength measurements in a monitored environment fingerprint model are determined to have satisfied a similarity condition with the set of signal strength measurements. In an embodiment, at block 1204 and with reference to FIG. 13, the server computing device 106/300 and/or the mobile computing device 1302 may compare the set of signal strength measurements (e.g., $\{S_{1306d}, S_{1306e}, S_{1306f}, S_{1306g}\}$) to sets of fingerprint signal strength measurements (e.g., $\{S_{1304a}, S_{1304b}, S_{1304c}, S_{1304d}, S_{1304e}, S_{1304f}, S_{1304g}\}$) in a monitored environment fingerprint model that may be stored in the monitored environment fingerprint models 308a in the storage system 308 of the server computing device 300. Each set of fingerprint signal strength measurements may be associated with a known location (e.g., a known set of coordinates).

If the set of signal strength measurements has a similarity score to a set of fingerprint signal strength measurements that satisfies the similarity condition (e.g., a similarity score greater than 95%, 90%, 85%, or other similarity conditions), then that set of fingerprint signal strength measurements may be selected as a candidate set of fingerprint signal strength measurements. Otherwise, the set of fingerprint signal strength measurements is ignored if the similarity score does not satisfy the similarity condition.

To determine a similarity score between set of signal strength measurements and the sets of fingerprint signal strength measurements, any distance metric may be used. For example, the following equation may be used to determine the difference between the set of signal strength measurements and each set of fingerprint signal strength measurements:

$$[D_k^o] = \left[\left(\sum_{i=1}^{N} |S_{i,k} - s_i|^o\right)^{\frac{1}{o}}\right]^{-1}$$

Figure 13:
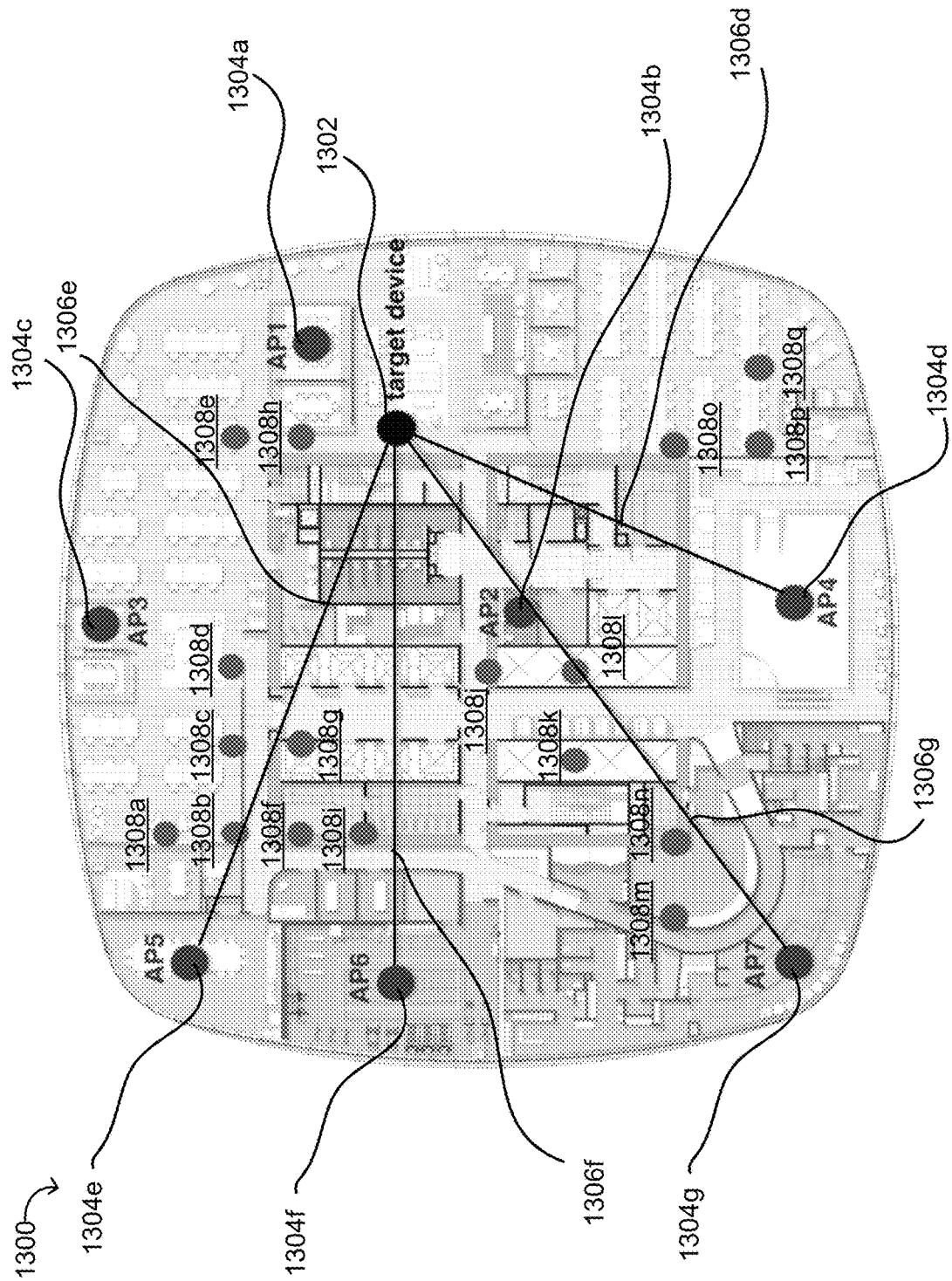
FIG. 13 is a monitored environment map used to determine a path-loss localization during the operations of the method of FIG. 12, in accordance with some embodiments.

In the illustrated example in FIG. 13, the server computing device 106/300 and/or the mobile computing device 1300 may determine that the fingerprint locations 1308a-1308q of the monitored environment fingerprint model are associated with a respective set of fingerprint signal strength measurements that satisfy the similarity condition with the set of signal strength measurements for the mobile computing device 1302. Each of the fingerprint locations 1308a-1308q may be associated with a known coordinate.

Figure 14:
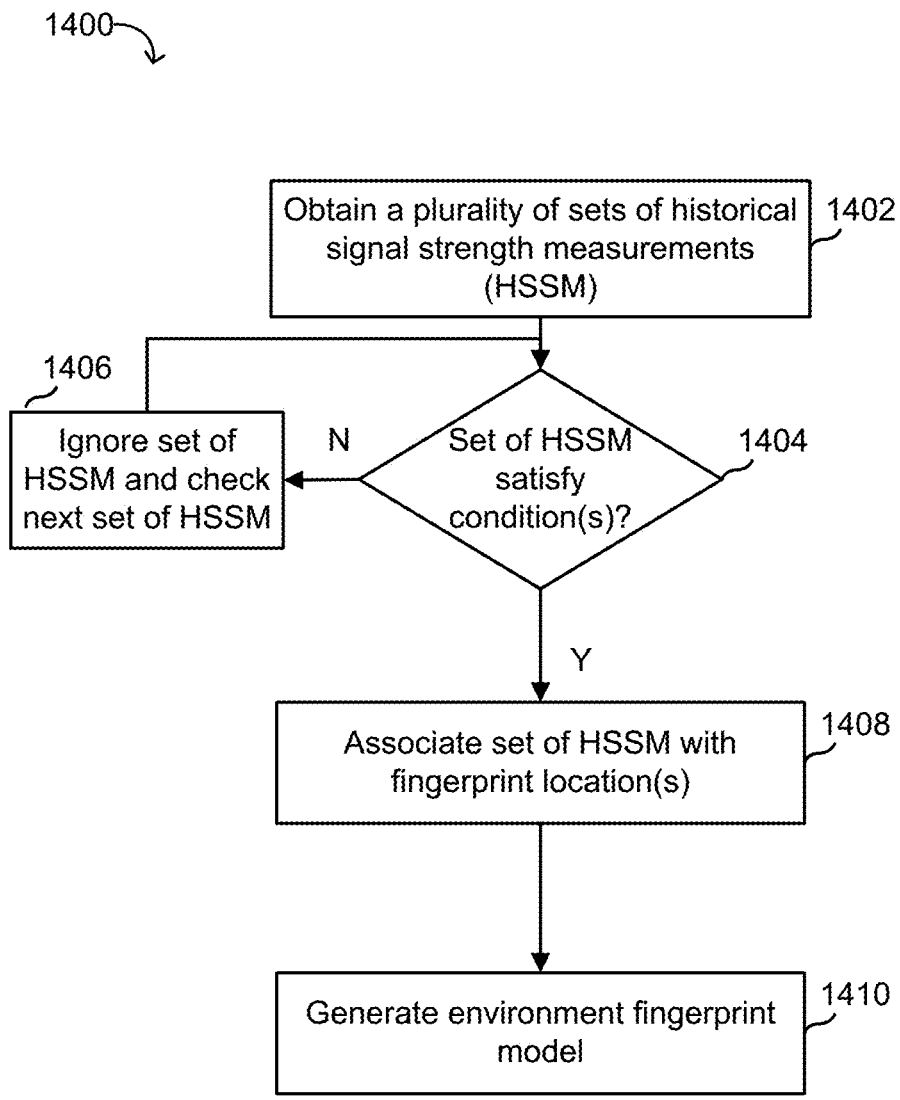
FIG. 14 is a flowchart of a method to determine the monitored environment fingerprint model of a monitored environment that is used with the path-loss localization of the method in FIG. 12, in accordance with some embodiments.
Figure 15:
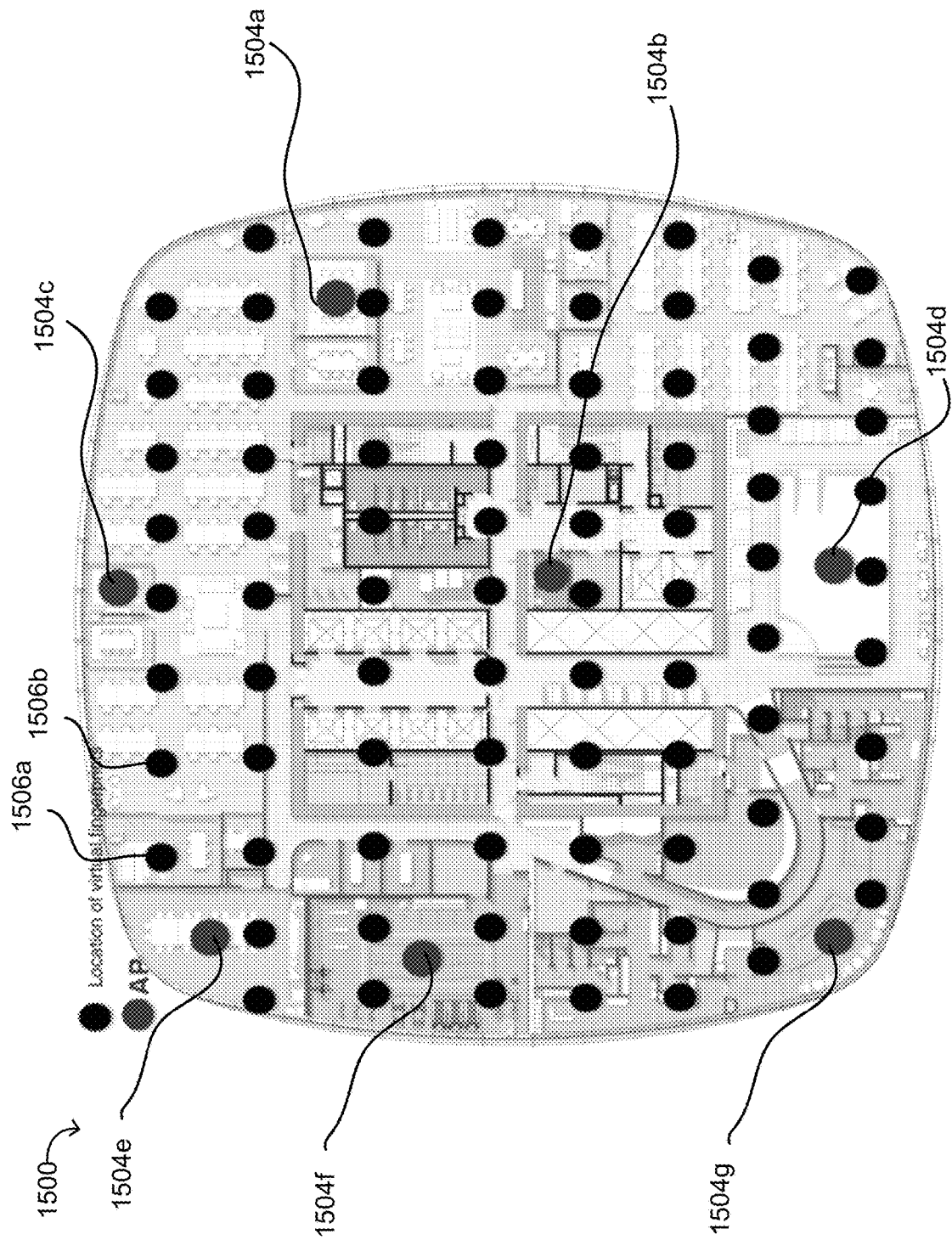
FIG. 15 is a monitored environment map used to determine the monitored environment fingerprint model during the operations of the method of FIG. 14, in accordance with some embodiments.

In various embodiments, the monitored environment fingerprint model may be generated according to method 800 of FIG. 8. However, in other embodiments and with reference to FIG. 14 a flowchart of a method 1400 of generating an environment fingerprint model used in the method 1200 is illustrated. As discussed above and referring to FIG. 15, the training of the environment fingerprint model may occur without requiring an administrator to physically go to each fingerprint location (as indicated by the dots (e.g., fingerprint locations 1506a and 1506b)) to obtain signal strength measurements for the monitored environment 1500, which is the monitored environment 1300 in the example illustrated in FIG. 13. As such, the process of training of the environment fingerprint model can be updated quickly when there is a change (e.g., a wall is moved, furniture moved, an access point changes locations, etc.) to the monitored environment 1300/1500. The process described below also allows for a scalable environment fingerprint model and augmentation of missing data in the environment fingerprint model.

The method 1400 begins at block 1402 where a plurality of sets of historical signal strength measurements of wireless radio frequency signals are obtained in the monitored environment. In an embodiment, at block 1402, an environment fingerprint model training may occur. For example, access points 1304a-1304g may periodically obtain signal strength measurements of connected devices over a time period (e.g., a day, 2 days, a week, 2 weeks, a month). The access points 1504a-1504g of FIG. 15, which may be the access points 1304a-1304g of FIG. 13, may provide the historical signal strength measurements to server computing device 106/300. The environment modeling/localization controller 304 on the server computing device 106/300 may compile the historical signal strength measurements into sets of historical signal strength measurements based on a device identifier associated each historical signal strength measurement and a time at which that historical signal strength measurement was measured. For example, a set of historical signal strength measurements may include, {$Sh_{1504a}$, $Sh_{1504b}$, $Sh_{1504c}$, $Sh_{1504d}$, $Sh_{1504e}$, $Sh_{1504f}$, $Sh_{1504g}$}.

The method 1400 may proceed to decision block 1404 where it is determined whether each set of the plurality of historical signal strength measurements satisfies one or more conditions. In an embodiment, at decision block 1404, the environment modeling/localization controller 304 on the server computing device 106/300 may determine whether each set of the plurality of historical signal strength measurements satisfies one or more conditions for each fingerprint location (e.g., each dot of the grid of dots in FIG. 15). For example, the server computing device 106/300 may determine whether an access point connection condition with the plurality of access points 1504a-1504g is satisfied. The access point connection condition may include a threshold number of historical signal strength measurements per set of historical signal strength measurements. For example, the access point connection condition may require that a set of historical signal strength measurements include a historical signal strength measurement from all the access points 1504a-1504g in the monitored environment 1500 (e.g., {$Sh_{1504a}$, $Sh_{1504b}$, $Sh_{1504c}$, $Sh_{1504d}$, $Sh_{1504e}$, $Sh_{1504f}$, $Sh_{1504g}$}). However, in other embodiments, the access point connection condition may require fewer historical signal strength measurements from the access points 1504a-1504g in the set of historical strength measurements (e.g., {$Sh_{1504a}$, $Sh_{1504b}$, $Sh_{1504c}$, $Sh_{1504e}$, $Sh_{1504f}$, $Sh_{1504g}$}).

In addition, the server computing device 106/300 may determine whether an expected signal strength pattern condition is satisfied. For a fingerprint location, the expected signal strength pattern condition may include an expected pattern of an ideal channel for that fingerprint location. For example and with respect to the fingerprint location 1506a, the access point 1504e is the closest access point to the fingerprint location 1506a, the access point 1504c is the next closest, the access point 1504f is the third closest, the access point 1504b is the fourth closest, the access point 1504a is the fifth closest, the access point 1504g is the sixth closest, and the access point 1504d is the farthest. As such, it would be expected that the closer the access point, the greater the signal strength. The expected signal pattern condition for the fingerprint location 1506a would include a set of signal strength measurements that follow the distance pattern such that a signal strength measurement of a set of historical signal strength measurements that is associated with the access point 1504e should have the greatest signal strength in that set of historical signal strength measurements, the signal strength measurement associated with the access point 1504c should have the second greatest signal strength measurement and so on such that the signal strength measurement associated with the access point 1504d would have lowest signal strength measurement.

If, at decision block 1404, the one or more conditions are not satisfied, the method 1406 may proceed to block 1406 where the set of historical signal strength measurements is ignored and another set of historical signal strength measurements is checked to determine whether the that set satisfies the condition in decision block 1404. If, at decision block 1404, the condition is not satisfied, the method 1400 may proceed to block 1408 where that set of historical signal strengths is associated with the fingerprint location. The method 1400 may perform decision block 1404 for each fingerprint location in the monitored environment 1500 and a portion of the plurality of sets of historical signal strength measurements that satisfy the condition may be associated with each fingerprint location. As such, some sets of plurality of sets of historical signal strengths may be associated with more than one fingerprint location. For example, the fingerprint location 1506b may have the same expected signal strength pattern as the fingerprint location 1506a, and thus may share the same sets of the historical signal strengths.

While some example conditions are discussed above, one of skill in the art in possession of the present disclosure will recognize that other conditions may be considered when associating a set of historical signal strength measurements with a fingerprint location, which may result in the fingerprint locations 1506a and 1506b having different sets of historical signal strength measurements. In other embodiments, calendar data may be used to determine room level localization (e.g., determining which fingerprint locations are associated with a particular room). As such, the signal strength measurements may be associated with a fingerprint location in a first room over a fingerprint location in a second room if a meeting was scheduled in the first room when the signal strength measurement was obtained. To even further sort sets of historical signal strength measurements, the calendar data may include identifiers of users that are attending the meeting in a particular room. As such, a higher probability that a user whose associated mobile computing device is being detected at the time of the meeting is more likely in that room than a computing device that is associated with a person not scheduled. In various, embodiments, the labels of a set of signal strength measurements being in a room or not based on the probability from calendar data may be used to train a room classifier for environment fingerprint model (e.g., using the machine learning algorithm 304a of FIG. 3 and more specifically a neural network 1000 of FIG. 10.

In various embodiments, the blocks 1404 and 1408 may be performed using the expression:

$$\{S_k\}_{opt} = \mathrm{argmax}_{\{s_i\}} \{P(s_i \mid \{x_k, y_k\})\}$$

s.t.

i) $|s_i| = N$ ii) $\mathrm{arg\,sort}(s_i) = \mathrm{arg\,sort}\left(\frac{1}{d_{ik}}\right)$ In this equation: $s_i$ is the RSSI sample from the ith beacon (i=1, 2, 3, ..., N) if vector S=[$s_1$, $s_2$, ... $s_N$] has N samples (condition I, |S|=N), it means the vector is fully connected. The second condition states the order of sorted vector S, should be the same as the order of sorted inversed-distance (1/$d_{ik}$), where $d_{ik}$ is the distance of point k with ($x_k$, $y_k$) from ith beacon. Term { $S_k$} shows the distribution of RSSI samples that satisfy the two constraints and is most probable to be at ($x_k$, $y_k$).

The method 1400 may proceed to block 1410 where the environment fingerprint model is generated. In an embodiment, at block 1410, the server computing device 106/300 may generate the environment fingerprint model that includes the plurality of fingerprint locations and the sets of fingerprint signal strength measurements, discussed above in method 1200. The set of fingerprint signal strength measurements for a fingerprint location may be based on sets of historical signal strengths that are associated with that fingerprint location. For example, the sets of historical signal strength measurements associated with a fingerprint location may be averaged to generate the set of fingerprint signal strength measurements. However, other calculation techniques may be envisioned to generate the set of fingerprint signal strength measurements from the set or sets of historical signal strength measurements.

In some embodiments, some of the fingerprint locations may not have any sets of historical signal strength measurements associated with them during the method 1400. When this occurs, the access point connection condition for associating a set of historical signal strength measurements may be relaxed such as finding sets of historical signal strength measurements that have one less access point connected. The missing signal strength measurement for the access point that is not included in the set of the historical signal strength measurement may be augmented by approximating the signal strength measurement using the path-loss equation:

$$P_{ij} = P_0 - 10\alpha \log(d_i) + X_i$$

where $P_0$ is the average signal strength at a distance of 1 meter, $\alpha$ is the path loss exponent, $d_i$ is the distance between the fingerprint location and the access point location, and $X_i$ is the Gaussian noise modeling multipath fading constant.

Referring back to FIG. 12 and the method 1200, the method 1200 may proceed to block 1206 where a path-loss exponent is calculated using one or more sets of fingerprint signal strength measurements that satisfy the similarity condition. In an embodiment, at block 1206 and with reference to FIG. 13, the server computing device 106/300 may determine a path-loss exponent for each fingerprint signal strength measurement included in a set of fingerprint signal strength measurements for each of the fingerprint locations 1308a-1308q. For each fingerprint location 1308a-1308q, four path-loss exponents may be calculated, one for each access point 1304d, 1304e, 1304f, and 1304g. For example, the path-loss exponent may be calculated using the path-loss equation:

$$P_{ij} = P_0 - 10\alpha \log(d_i) + X_i$$

Path-loss exponent "$\alpha$" may be calculated using the distance between the access point and the fingerprint location from the known locations of the access points and fingerprint locations, $P_{ij}$ is the fingerprint signal strength measurement at the fingerprint location and the particular access point. $P_0$ and $X_i$ are also known. In the example illustrated in FIG. 13, 68 path-loss exponents may be obtained from the 17 fingerprint locations 1308a-1308q.

Next, one of the path-loss exponents of the 68 path-loss exponents will be selected. The server computing device 106/300 may perform a centroid algorithm that performs a grid scan to find the intersection area of the access point ranges of the access points 1304d-1304g, which is known as a centroid solution space. The path-loss exponent may be estimated for the for the access points 1304d-1304g that results in the minimum centroid solution space by incrementally decreasing an initial path-loss exponent until the optimum path-loss exponent that results in the smaleast centroid solution space is obtained. For example, the following algorithm (as described in "VariLoc: Path Loss Exponent Estimation and Localization Using Multi-Range Beaconing" [Golestanian, M. and Poellabauer, C., 2019. *IEEE Communication Letters* (vol. 23, no. 4, pp. 724-727)], herein incorporated by reference in its entirety) may be used to determine the path-loss exponent:

```
Input: θ_i, P_0k, ε
P_0i = VariLocRanging(θ_i, P_0k)        # minimum tx-power
P_i,j = P_0i − 10 α log (d_j/d_0) + X_i,j   # channel model
α = 10                                   # initial value of path-loss exponent
Ω = Centroid(θ_i, P_i,j, α)              # Centroid localization
while abs Ω == 0 do
    α = α − ε
    Ω = Centroid(θ_i, P_i,j, α)
end
Ω = Centroid(θ_i, P_i,j, α)              # Centroid with average RSS
```

$$\hat{\theta} = \left( \frac{\sum_{k=1}^{|\Omega|} x_k}{|\Omega|}, \frac{\sum_{k=1}^{|\Omega|} y_k}{|\Omega|} \right)$$

return(α, $\hat{\theta}$)

The path-loss exponent "α" calculated for the access points 1304d-1304g may be compared to the 68 path-loss exponents calculated for the fingerprint locations 1308a-1308q. A path-loss exponent of the 68 path-loss exponents may be selected when it is the closest path-loss exponent to the estimated path-loss exponent for the access points 1304d-1304g.

The method 1200 may then proceed to block 1208 where a location of the first mobile computing device in the monitored environment that satisfies a location condition is determined using the path-loss exponent in a path-loss localization algorithm. In an embodiment, at block 1208, the server computing device 106/300 may use the path-lass exponent selected in block 1206 to determine a location of the mobile computing device 1302. Using the path-loss exponent, the known locations of the access points 1304d-1304g, and the set of signal strength measurements for the mobile computing device 1302, the optimum location of the mobile computing device 1302 may be determined. For example, the equation:

$$\{\hat{x}, \hat{y}\} = \text{argmin}_{(x,y)} \left( \sum_{i=1}^{N} (RSS_i - RSS_i^*)^2 \right)$$

may be used to determine the minimum set of coordinates (e.g., (x, y)) for location of the mobile computing device 1302. $RSS_i$ may be the signal strength measurement for each access point 1304d-1304g. $RSS_i^*$ may be the ideal signal strength between an access point and the mobile computing device and may be calculated using a path-loss algorithm such as, for example, the following equation:

$$RSS_i^* = p_0 - 10\alpha \log(\sqrt{(x^* - x_i)^2 + (y^* - y_i)^2})$$

As discussed above "α" is the selected path-loss exponent, "$p_0$" is known, "$x_i$" and "$y_i$" are the coordinates of the access point, and "x*" and "y*" are the unknown coordinates of the mobile computing device 1302. Using the above equations, "x*" and "y*" may be determined, which is the estimated location of the mobile computing device 1302 in the monitored environment 1300.

In an experiment using the methods 1200 and 1400 of the present disclosure, higher accuracy was achieved compared to other conventional path-loss based methods (e.g., Centroid, WLS, LS, and Cisco DNA). For example, the systems and methods of the present disclosure resulted in a median error of 1.8 meters, while the WLS had a median error of 4.1 meters, the centroid method had a median error of 5.6 meters, and the Cisco localization had a median error of 8.6 meters. As such, more accurate results were achieved using the systems and methods of the present disclosure over conventional path-loss based localization systems.

The method 1200 may then proceed to block 1210 where one or more actions are performed using the location of the mobile computing device. In an embodiment, at block 1210, the server computing device 300 may execute instructions based on the generation of the location of the mobile computing device 1302. For example, the server computing device 106/300 may store the location of the mobile computing device 1302 in a computer-readable media in communication with the server computing device 106/300. Specifically, the server computing device 106/300 may store the location of the mobile computing device 1302 in the storage system 308 in a localization repository for the mobile computing device 1302 (e.g., the mobile computing device localizations 308b). In other embodiments, the server computing device 106/300 may provide the location of the mobile computing device 1302 to the mobile computing device 1302 via the communication interface 306 and the network 108 such that the mobile computing device 1302 stores the location of the mobile computing device 1302 in the storage system 216.

In other examples of actions performed using the location of the mobile computing device 1302, the localization controller 204 included on the mobile computing device 102/200 may display the location of the mobile computing device 1302 on a display included in the display system 220. While the location of the mobile computing device 1302 may be displayed by itself, in other embodiments, an environment model (e.g., a map) may be associated with the location of the mobile computing device 1302. The monitored environment map may be retrieved from the monitored environment maps 308c via the network 108 and/or from the monitored environment maps 216d included on the mobile computing device 200.

In yet other examples, the location of the mobile computing device 1302 may be provided to a navigation system that is included as an algorithm in the localization controller 204, as a service provided on the server computing device 106/300, and/or another server computing device dedicated to providing a navigation system. The user 112 of the mobile computing device 102/200 may provide the location of the mobile computing device 1302 as part of their participation in those navigation systems that may be native application-based or web browser-based. The navigation system may retrieve the location of the mobile computing device 1302 and then utilize the monitored environment map to determine a navigation path through the monitored environment 101 from the current location to a destination location identified by the user 112. The navigation system may then provide the navigation path and the monitored environment map for display via the display system 220. While a few examples of performing an action using the location of the mobile computing device 1302 have been described, one of skill in the art in possession of the present disclosure will recognize that any of a variety of actions may be performed using the location of the mobile computing device 1302 in a variety of manners that will fall within the scope of the present disclosure. In some embodiments, the method 1200 may then reset and return to block 1202 for further iterations of the method 1200.

Figure 16:
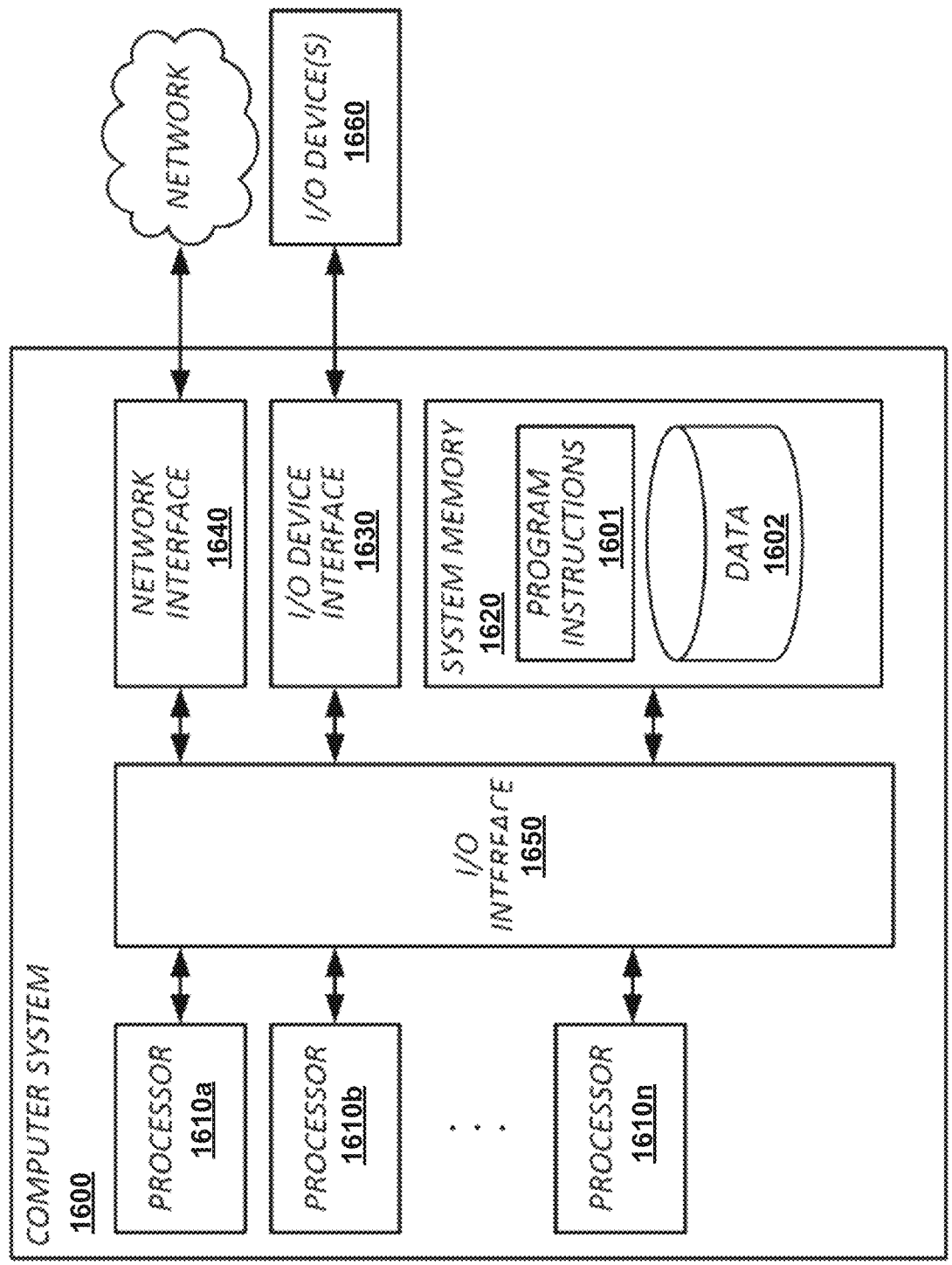
FIG. 16 shows an example of a computing device by which the present techniques may be implemented, in accordance with some embodiments.

FIG. 16 is a diagram that illustrates an exemplary computing system 1600 in accordance with embodiments of the present technique. Various portions of systems and methods described herein, may include or be executed on one or more computer systems similar to computing system 1600. For example, the mobile computing device 102/200/1302, the server computing device 106/300, the beacon 110, and/or the access points 116/1100/1304a-1304g may be provided by the computing system 1600. Further, processes and modules described herein may be executed by one or more processing systems similar to that of computing system 1600.

Computing system 1600 may include one or more processors (e.g., processors 1610a-1110n) coupled to system memory 1620, an input/output I/O device interface 1630, and a network interface 1640 via an input/output (I/O) interface 1650. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1600. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1620). Computing system 1600 may be a uni-processor system including one processor (e.g., processor 1610a), or a multi-processor system including any number of suitable processors (e.g., 1610a-1110n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1600 may include a plurality of computing devices (e.g., distributed computer systems) to implement various processing functions.

I/O device interface 1630 may provide an interface for connection of one or more I/O devices 1660 to computer system 1600. I/O devices may include devices that receive input (e.g., from a user) or output information (e.g., to a user). I/O devices 1660 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1660 may be connected to computer system 1600 through a wired or wireless connection. I/O devices 1660 may be connected to computer system 1600 from a remote location. I/O devices 1660 located on remote computer system, for example, may be connected to computer system 1600 via a network and network interface 1640.

Network interface 1640 may include a network adapter that provides for connection of computer system 1600 to a network. Network interface 1640 may facilitate data exchange between computer system 1600 and other devices connected to the network. Network interface 1640 may support wired or wireless communication. The network may include an electronic communication network, such as the Internet, a local area network (LAN), a wide area network (WAN), a cellular communications network, or the like.

System memory 1620 may be configured to store program instructions 1601 or data 1602. Program instructions 1601 may be executable by a processor (e.g., one or more of processors 1610a-1010n) to implement one or more embodiments of the present techniques. Instructions 1601 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1620 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1620 may include a non-transitory computer readable storage medium that may have program instructions stored thereon that are executable by a computer processor (e.g., one or more of processors 1610a-1110n) to cause the subject matter and the functional operations described herein. A memory (e.g., system memory 1620) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1650 may be configured to coordinate I/O traffic between processors 1610a-1010n, system memory 1620, network interface 1640, I/O devices 1660, and/or other peripheral devices. I/O interface 1650 may perform protocol, timing, or other data transformations to convert data signals from one component (e.g., system memory 1620) into a format suitable for use by another component (e.g., processors 1610a-1010n). I/O interface 1650 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1600 or multiple computer systems 1600 configured to host different portions or instances of embodiments. Multiple computer systems 1600 may provide for parallel or sequential processing/execution of one or more portions of the techniques described herein.

Those skilled in the art will appreciate that computer system 1600 is merely illustrative and is not intended to limit the scope of the techniques described herein. Computer system 1600 may include any combination of devices or software that may perform or otherwise provide for the performance of the techniques described herein. For example, computer system 1600 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1600 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1100 may be transmitted to computer system 1100 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Similarly, reference to "a computer system" performing step A and "the computer system" performing step B can include the same computing device within the computer system performing both steps or different computing devices within the computer system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, e.g., in the form of arguments of a function or API call. To the extent bespoke noun phrases (and other coined terms) are used in the claims and lack a self-evident construction, the definition of such phrases may be recited in the claim itself, in which case, the use of such bespoke noun phrases should not be taken as invitation to impart additional limitations by looking to the specification or extrinsic evidence.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

The present techniques will be better understood with reference to the following enumerated embodiments:

1. A non-transitory, machine-readable medium storing instructions that, when executed by one or more processors, effectuate operations comprising: acquiring, using a computer system, signal strength information that is based on signal strength of wireless radio frequency signals detected by a wireless transceiver included in a mobile computing device and that includes a plurality of signal strength measurements that are each associated with a respective wireless signal measurement time; generating, using the computer system, a wireless signal-based localization by localizing, using a wireless signal-based localization algorithm, the mobile computing device based on the plurality of signal strength measurements and known locations of beacon devices that transmit the wireless radio frequency signals; acquiring, using the computer system, mobility information from one or more mobility sensors included in the mobile computing device, wherein the mobility information includes a plurality of mobility sensor measurements that are each associated with a respective mobility sensor measurement time; generating, using the computer system, a mobility-based localization by localizing, using a mobility-based localization algorithm, the mobile computing device based on the plurality of mobility sensor measurements; fusing, using the computer system and based on a fusion algorithm, the wireless signal-based localization and the mobility-based localization based on correspondence between the respective wireless signal measurement time for the at least the portion of the signal strength measurements and the respective mobility sensor measurement time for the at least the portion of the mobility sensor measurement time to generate a fused mobile computing device localization; and storing, using the computer system, the fused mobile computing device localization in a computer-readable media in communication with the computer system.

2. The medium of embodiment 1, wherein the wireless radio frequency signals are Bluetooth Low Energy (BLE) devices.

3. The medium of any one of embodiments 1-2, wherein the operations further comprise: overlaying, using the computer system, the fused mobile computing device localization with a map of a monitored environment in which the mobile computing device is located thereby generating a fused mobile computing device localization map.

4. The medium of embodiment 3, wherein the operations further comprise: causing, using the computer system, to display the fused mobile computing device localization map on a display device coupled to the computer system.

5. The medium of embodiment 4, wherein the display device is included on the mobile computing device.

6. The medium of any one of embodiments 1-5, wherein the wireless signal-based localization algorithm includes a centroid localization algorithm.

7. The medium of any one of embodiments 1-6, wherein the mobility-based localization algorithm includes a dead reckoning localization algorithm.

8. The medium of embodiment 7, wherein the dead reckoning localization algorithm includes a step detection algorithm.

9. The medium of any one of embodiments 1-8, wherein the fusion algorithm includes an Iterative Closest Point (ICP) algorithm.

10. The medium of any one of embodiments 1-9, wherein the operations further comprise: obtaining, using the computer system, subsequent signal strength information and subsequent mobility information; updating, using the computer system, the wireless signal-based localization based on the subsequent signal strength information; updating, using the computer system, the mobility-based localization based on the subsequent signal strength information; updating, using the computer system, the fused mobile computing device localization based on the updated wireless signal-based localization and the updated mobility-based localization; and causing, using the computer system, to display the updated fused mobile computing device localization on a display device coupled to the computer system.

11. The medium of any one of embodiments 1-10, wherein the operations further comprise: determining, using the computer system and using a machine learning algorithm, a fingerprint model for a monitored environment in which the mobile computing device is located based on the fused mobile computing device localization and a plurality of other fused mobile computing device localizations associated with at least one of the mobile computing device or at least one other mobile computing device and associated with the monitored environment.

12. The medium of embodiment 11, wherein the operations further comprise: generating, by the computer system and using the fingerprint model, a map of the monitored environment.

13. The medium of embodiment 12, wherein the operations further comprise: providing, using the computer system, the map for display at a display coupled to the computer system.

14. The medium of embodiment 13, wherein the display is included on the mobile computing device.

15. The medium of embodiment 11, wherein the operations further comprise: selecting, using the computer system, the other fused mobile computing device localizations based on mobile computing devices that include a wireless transceiver and one or more sensors that correspond with the wireless transceiver and the one or more mobility sensors included on the mobile computing device and that satisfy a measurement similarity condition.

16. The medium of embodiment 11, wherein the operations further comprise: classifying, using the computer system, one or more areas within the monitored environment based on the signal strength information included in the fused mobile computing device localization and the plurality of other fused mobile computing device localizations.

17. The medium of embodiment 16, wherein the classifying the one or more areas includes classifying at least one of a boundary for each of the one or more areas or a location of any beacon devices within the one or more areas.

18. The medium of any one of embodiments 1-17, wherein the operations comprise steps for determining the wireless signal-based localization.

19. The medium of any one of embodiments 1-18, wherein the operations further comprise steps for fusing the wireless signal-based localization and the mobility-based localization.

20. A method, comprising: the operations of any one of embodiments 1-19.

21. A system, comprising: one or more processors; and memory storing instructions that when executed by the processors cause the processors to effectuate operations comprising: the operations of any one of embodiments 1-19.

What is claimed is:

1. A non-transitory, machine-readable medium storing instructions that, when executed by one or more processors, effectuate operations comprising:
acquiring, using a computer system, signal strength information that is based on signal strength of wireless radio frequency signals detected by a wireless transceiver included in a mobile computing device and that includes a plurality of signal strength measurements that are each associated with a respective wireless signal measurement time;
generating, using the computer system, a wireless signal-based localization by localizing, using a wireless signal-based localization algorithm, the mobile computing device based on the plurality of signal strength measurements and known locations of beacon devices that transmit the wireless radio frequency signals;
acquiring, using the computer system, mobility information from one or more mobility sensors included in the mobile computing device, wherein the mobility information includes a plurality of mobility sensor measurements that are each associated with a respective mobility sensor measurement time;

generating, using the computer system, a mobility-based localization by localizing, using a mobility-based localization algorithm, the mobile computing device based on the plurality of mobility sensor measurements;

fusing, using the computer system and based on a fusion algorithm, the wireless signal-based localization and the mobility-based localization based on correspondence between the respective wireless signal measurement time for at least a portion of the plurality of signal strength measurements and the respective mobility sensor measurement time for at least a portion of the plurality of mobility sensor measurements to generate a fused mobile computing device localization; and storing, using the computer system, the fused mobile computing device localization in a computer-readable media in communication with the computer system.

2. The medium of claim 1, wherein the wireless radio frequency signals are Bluetooth Low Energy (BLE) devices.

3. The medium of claim 1, wherein the operations further comprise:

overlaying, using the computer system, the fused mobile computing device localization with a map of a monitored environment in which the mobile computing device is located thereby generating a fused mobile computing device localization map.

4. The medium of claim 3, wherein the operations further comprise:

causing, using the computer system, to display the fused mobile computing device localization map on a display device coupled to the computer system.

5. The medium of claim 4, wherein the display device is included on the mobile computing device.

6. The medium of claim 1, wherein the wireless signal-based localization algorithm includes a centroid localization algorithm.

7. The medium of claim 1, wherein the mobility-based localization algorithm includes a dead reckoning localization algorithm.

8. The medium of claim 7, wherein the dead reckoning localization algorithm includes a step detection algorithm.

9. The medium of claim 1, wherein the fusion algorithm includes an Iterative Closest Point (ICP) algorithm.

10. The medium of claim 1, wherein the operations further comprise:

obtaining, using the computer system, subsequent signal strength information and subsequent mobility information;

updating, using the computer system, the wireless signal-based localization based on the subsequent signal strength information;

updating, using the computer system, the mobility-based localization based on the subsequent signal strength information;

updating, using the computer system, the fused mobile computing device localization based on the updated wireless signal-based localization and the updated mobility-based localization; and causing, using the computer system, to display the updated fused mobile computing device localization on a display device coupled to the computer system.

11. The medium of claim 1, wherein the operations further comprise:

determining, using the computer system and using a machine learning algorithm, a fingerprint model for a monitored environment in which the mobile computing device is located based on the fused mobile computing device localization and a plurality of other fused mobile computing device localizations associated with at least one of the mobile computing device or at least one other mobile computing device and associated with the monitored environment.

12. The medium of claim 11, wherein the operations further comprise:

generating, by the computer system and using the fingerprint model, a map of the monitored environment.

13. The medium of claim 12, wherein the operations further comprise:

providing, using the computer system, the map for display at a display coupled to the computer system.

14. The medium of claim 13, wherein the display is included on the mobile computing device.

15. The medium of claim 11, wherein the operations further comprise:

selecting, using the computer system, the plurality of other fused mobile computing device localizations based on mobile computing devices that include a wireless transceiver and one or more sensors that correspond with the wireless transceiver and the one or more mobility sensors included on the mobile computing device and that satisfy a measurement similarity condition.

16. The medium of claim 11, wherein the operations further comprise:

classifying, using the computer system, one or more areas within the monitored environment based on the signal strength information included in the fused mobile computing device localization and the plurality of other fused mobile computing device localizations.

17. The medium of claim 16, wherein the classifying the one or more areas includes classifying at least one of a boundary for each of the one or more areas or a location of any beacon devices within the one or more areas.

18. The medium of claim 1, wherein the operations comprise steps for determining the wireless signal-based localization.

19. The medium of claim 1, wherein the operations further comprise steps for fusing the wireless signal-based localization and the mobility-based localization.

20. A method, comprising:

acquiring, using a computer system, signal strength information that is based on signal strength of wireless radio frequency signals detected by a wireless transceiver included in a mobile computing device and that includes a plurality of signal strength measurements that are each associated with a respective wireless signal measurement time;

generating, using the computer system, a wireless signal-based localization by localizing, using a wireless signal-based localization algorithm, the mobile computing device based on the plurality of signal strength measurements and known locations of beacon devices that transmit the wireless radio frequency signals;

acquiring, using the computer system, mobility information from one or more mobility sensors included in the mobile computing device, wherein the mobility information includes a plurality of mobility sensor measurements that are each associated with a respective mobility sensor measurement time;

generating, using the computer system, a mobility-based localization by localizing, using a mobility-based localization algorithm, the mobile computing device based on the plurality of mobility sensor measurements;

fusing, using the computer system and based on a fusion algorithm, the wireless signal-based localization and the mobility-based localization based on correspondence between the respective wireless signal measurement time for at least a portion of the plurality of signal strength measurements and the respective mobility sensor measurement time for at least a portion of the plurality of mobility sensor measurements to generate a fused mobile computing device localization; and storing, using the computer system, the fused mobile computing device localization in a computer-readable media in communication with the computer system.

\* \* \* \* \*